United States Patent
Gao et al.

(10) Patent No.: US 11,671,556 B2
(45) Date of Patent: Jun. 6, 2023

(54) METHOD OF PERFORMING VIDEO CALL AND DISPLAY DEVICE

(71) Applicant: JUHAOKAN TECHNOLOGY CO., LTD., Qingdao (CN)

(72) Inventors: Kun Gao, Qingdao (CN); Yujian Ma, Qingdao (CN); Ruoqiang Qiu, Qingdao (CN); Hongye Ren, Qingdao (CN); Jian Teng, Qingdao (CN); Zhendong Ma, Qingdao (CN); Shuaiqi Liang, Qingdao (CN)

(73) Assignee: JUHAOKAN TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/242,649

(22) Filed: Apr. 28, 2021

(65) Prior Publication Data
US 2021/0250540 A1   Aug. 12, 2021

Related U.S. Application Data

(63) Continuation of application No. PCT/CN2020/077178, filed on Feb. 28, 2020.

(30) Foreign Application Priority Data

Jun. 11, 2019   (CN) .......................... 201910502229.8
Jun. 11, 2019   (CN) .......................... 201910502717.9
Jul. 26, 2019   (CN) .......................... 201910680728.6

(51) Int. Cl.
*H04N 21/45*   (2011.01)
*H04N 5/45*    (2011.01)
(Continued)

(52) U.S. Cl.
CPC ........... *H04N 5/45* (2013.01); *G06F 3/04886* (2013.01); *H04L 67/55* (2022.05); *H04N 7/147* (2013.01); *H04N 7/152* (2013.01)

(58) Field of Classification Search
CPC ............................. H04N 21/235; H04N 21/20
See application file for complete search history.

(56) References Cited

U.S. PATENT DOCUMENTS 9,350,941 B2 *   5/2016   Kim ...................... H04L 65/612
10,798,338 B1 *  10/2020  Schoenberg ........ H04L 65/1089
(Continued)

FOREIGN PATENT DOCUMENTS

CN        1874494 A    12/2006
CN      101374175 A     2/2009
(Continued)

OTHER PUBLICATIONS

Office Action from Chinese Application No. 202010129731.1 dated Jan. 17, 2022 (11 pages).

*Primary Examiner* — Mushfikh I Alam
(74) *Attorney, Agent, or Firm* — Workman Nydegger

(57) ABSTRACT

Disclosed are a method of performing video call and a display device. The display device includes: a camera; a display, configured to present a window for a counterpart and/or a local window; and a processor, configured to: receive a push message sent from a server, wherein the push message is sent after the server receives a video call request sent from the mobile terminal; automatically establish a call process, and control the display to present the window for the counterpart and not to present the local window in response to the push message when the mobile terminal is authorized by the display device; and reject the video call request in response to the push message when the mobile terminal is not authorized by the display device.

18 Claims, 16 Drawing Sheets

(51) Int. Cl.
*G06F 3/04886* (2022.01)
*H04N 7/14* (2006.01)
*H04N 7/15* (2006.01)
*H04L 67/55* (2022.01)

(56) References Cited

U.S. PATENT DOCUMENTS

| | | | | |
|---|---|---|---|---|
| 11,395,043 | B2* | 7/2022 | Jin | H04N 21/47 |
| 2010/0060715 | A1* | 3/2010 | Laasik | H04N 21/426 |
| | | | | 370/352 |
| 2011/0205329 | A1* | 8/2011 | Willis | H04N 7/173 |
| | | | | 348/E7.083 |
| 2014/0043424 | A1* | 2/2014 | Gava | H04N 7/14 |
| | | | | 348/E7.078 |
| 2015/0045073 | A1* | 2/2015 | Koo | H04M 1/6041 |
| | | | | 455/566 |
| 2015/0095933 | A1* | 4/2015 | Blackburn | H04N 21/658 |
| | | | | 725/25 |
| 2018/0146127 | A1* | 5/2018 | Leung | H04N 5/23203 |
| 2020/0045095 | A1* | 2/2020 | Paxinos | H04L 65/765 |
| 2020/0168176 | A1* | 5/2020 | Chen | G06F 3/012 |

FOREIGN PATENT DOCUMENTS

| | | | |
|---|---|---|---|
| CN | 101431833 | A | 5/2009 |
| CN | 101605235 | A | 12/2009 |
| CN | 104322074 | A | 1/2015 |
| CN | 104603764 | A | 5/2015 |
| CN | 104683728 | A | 6/2015 |
| CN | 104754279 | A | 7/2015 |
| CN | 105611221 | A | 5/2016 |
| CN | 105792015 | A | 7/2016 |
| CN | 105872831 | A | 8/2016 |
| CN | 105872833 | A | 8/2016 |
| CN | 105898181 | A | 8/2016 |
| CN | 106454543 | A | 2/2017 |
| CN | 107181926 | A | 9/2017 |
| CN | 108377410 | A | 8/2018 |
| CN | 109246381 | A | 1/2019 |
| CN | 110365932 | A | 10/2019 |
| KR | 20030073014 | A | 9/2003 |

* cited by examiner

METHOD OF PERFORMING VIDEO CALL AND DISPLAY DEVICE

CROSS-REFERENCE TO RELATED APPLICATIONS

This application is a continuation application of International Application No. PCT/CN2020/077178 filed Feb. 28, 2020, which claims priority to Chinese Patent Application No. 201910502717.9 filed Jun. 11, 2019, Chinese Patent Application No. 201910502229.8 filed Jun. 11, 2019, and Chinese Patent Application No. 201910680728.6 filed Jul. 26, 2019. The entire disclosures of the above applications are incorporated herein by reference.

FIELD

The present disclosure relates to display technology, in particular to a method of performing video call and a display device.

BACKGROUND

This section provides background information related to the present disclosure which is not necessarily prior art.

At present, terminal with cameras makes social interactions between people more close. When a terminal initiates a video call, a server will forward a call request to another terminal, while a control of another terminal is clicked to accept the call. As such, the video call between the two terminals is set up. As can be seen, in the procedure of setting up a video call, operation of a user of a terminal is required, which makes the procedure inconvenient.

SUMMARY

This section provides a general summary of the disclosure, and is not a comprehensive disclosure of its full scope or all of its features.

In a first aspect, the present disclosure provides a display device, including a camera; a display, configured to present a window for a counterpart and/or a local window, where the window for the counterpart is a window configured to show image data sent from a mobile terminal, and the local window is a window configured to show image data collected from the camera; and a processor, where the processor is configured to: receive a push message sent from a server, wherein the push message is sent after the server receives a video call request sent from the mobile terminal; automatically establish a call process, and control the display to present the window for the counterpart and not to present the local window in response to the push message when the mobile terminal is authorized by the display device; and reject the video call request in response to the push message when the mobile terminal is not authorized by the display device.

On a second aspect, the present disclosure provides a method of performing video call applicable to a display device. The method of video call includes: presenting a window for a counterpart and/or a local window on a display of the display device, wherein the window for the counterpart is a window configured to show image data sent from a mobile terminal, and the local window is a window configured to show image data collected from a camera of the display device; receiving a push message sent from a server, wherein the push message is sent after the server receives a video call request sent from the mobile terminal; automatically establishing a call process, and controlling the display to present the window for the counterpart and not to present the local window in response to the push message when the mobile terminal is authorized by the display device; and rejecting the video call request in response to the push message when the mobile terminal is not authorized by the display device.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 exemplarily illustrates a schematic diagram of an operating scenario between a display device and a control device in an embodiment.

FIG. 2 exemplarily illustrates a block diagram of hardware configuration of a control device 100 in an embodiment.

FIG. 3 exemplarily illustrates a block diagram of hardware configuration of a display device 200 in an embodiment.

FIG. 4 exemplarily illustrates a block diagram of hardware architecture of a display device 200 in FIG. 3.

FIG. 5 exemplarily illustrates a schematic diagram of functional configuration of a display device 200 in an embodiment.

FIG. 6A exemplarily illustrates a schematic diagram of software configuration of a display device 200 in an embodiment.

FIG. 6B exemplarily illustrates a schematic diagram of configuration of applications in a display device 200 in an embodiment.

FIG. 7 exemplarily illustrates a schematic diagram of a user interface of a display device 200 in an embodiment.

FIG. 8A exemplarily illustrates a schematic diagram of a user interface after a display device automatically establishes a call process in an embodiment.

FIG. 8B exemplarily illustrates a schematic diagram of a user interface of the mobile terminal after a display device automatically establishes a call process in an embodiment as shown in FIG. 8A.

FIG. 8C exemplarily illustrates a schematic diagram of a user interface in which the display device switches small-window display mode into full-screen mode in the embodiment of FIG. 8A.

FIG. 9A exemplarily illustrates a schematic diagram of a user interface after a display device automatically establishes a call process in an embodiment.

FIG. 9B exemplarily illustrates a schematic diagram of a user interface of a mobile terminal after a display device automatically establishes a call process in the embodiment of FIG. 9A.

FIG. 10A exemplarily illustrates a schematic diagram of flows in an embodiment.

FIG. 10B exemplarily illustrates a schematic diagram of flows before sending an authentication request in an embodiment.

FIG. 10C exemplarily illustrates a schematic diagram of flows after sending an authentication request in an embodiment.

Corresponding reference numerals indicate corresponding parts or features throughout the several views of the drawings.

DETAILED DESCRIPTION

Example embodiments will now be described more fully with reference to the accompanying drawings.

Video calling is now one of the important means for people to socialize with each other, which can be realized after establishing a video call process between two devices. For the two devices, the device initiating a video call request is an initiator device, while the device receiving the video call request is an invitee device. The method of performing video call according to the present disclosure is not limited by hardware, and can be used in device with a single chip system, or in device with dual-systems of dual-chips. To facilitate understanding of dual chips and dual systems, the device with the dual-systems of dual chips is illustrated.

The terms used in the present disclosure are illustrated in combination with the accompanying drawings first. It should be noted herein that, the following descriptions of each term are merely for making the content of the present disclosure easy to understand, rather than for defining the protection scope of the present disclosure.

The term "module" used in some embodiments of the present disclosure may mean any known or later developed hardware, software, firmware, artificial intelligence, fuzzy logic, or a combination of hardware or/and software codes capable of performing functions associated with the element.

The term "remote control" used in some embodiments of the present disclosure refers to a component of electronic device (such as the display device disclosed in the present disclosure), which generally wirelessly controls the electronic device within a short range. The component can be generally connected with electronic device using infrared and/or radio frequency (RF) signals and/or Bluetooth. WiFi, wireless USB, Bluetooth, motion sensor and other functional modules can also be included in the component. For example, as to a handheld touch remote control, a user interface in a touch screen replaces most of the physical built-in hard keys in a typical remote control device.

The term "gesture" used in some embodiments of the present disclosure refers to a user behavior through which the user expresses an expected thought, action, purpose or outcome by a change in hand shape or hand motion, etc.

The term "hardware system" used in some embodiments of the present disclosure can refer to a physical component which consists of an integrated circuit (IC), a printed circuit board (PCB) and other mechanical, optical, electrical and magnetic devices and which has the functions of calculation, control, storage, input and output. In embodiments of the present disclosure, a hardware system is also usually called as a motherboard or a chip.

The term "operating system" used in some embodiments of the present disclosure can refer to a computer system in which codes in a memory are read by a processor and then presented to a user, such as "Android OS", "Mac OS", "Windows OS", etc.

Figure 1:
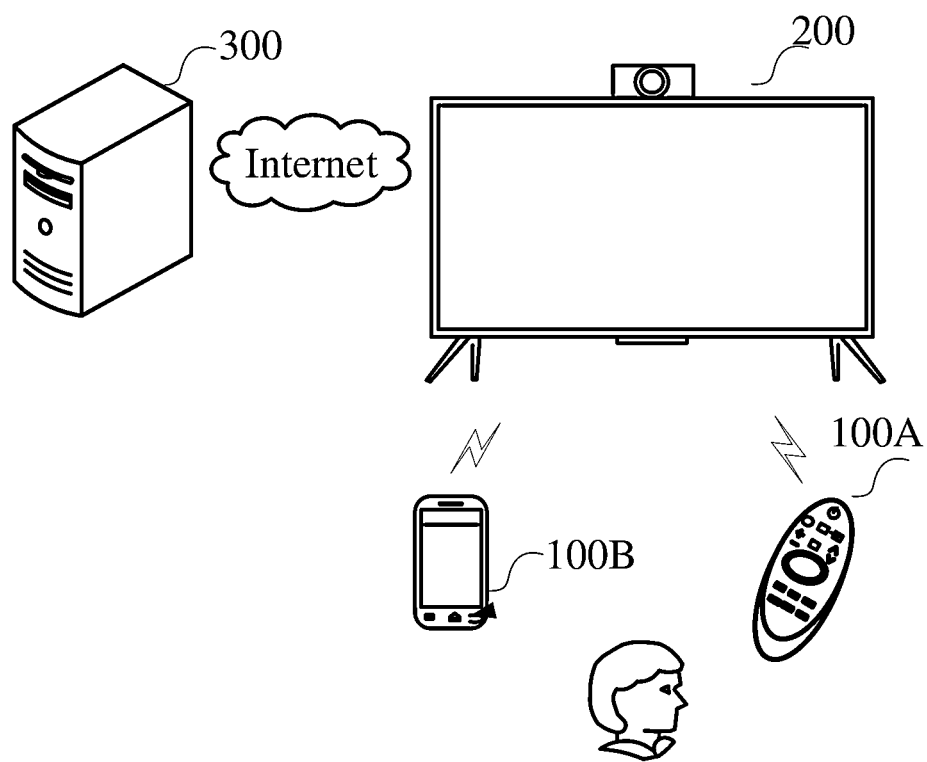

FIG. 1 exemplarily illustrates a schematic diagram of an operating scenario between a display device and a control device in an embodiment. As shown in FIG. 1, a user can operate a display device 200 through a control device 100.

Here the control device 100 can be a remote control 100A, and can communicate with the display device 200 through infrared protocol communication, Bluetooth protocol communication, ZigBee protocol communication or other short-distance communication methods, to control the display device 200 through wireless or other wired methods. A user can input user instructions through keys, voice input and control panel input of the remote control, to control the display device 200. For example, the user can input corresponding control instructions through the volume up and volume down keys, channel control keys, up/down/left/right movement keys, voice input key, menu key, on/off key and the like on the remote control, to control the functions of the display device 200.

The control device 100 can also be a smart device, for example, a mobile terminal 100B, a tablet computer, a computer, a notebook computer, etc., and can be communicated with the display device 200 through a local area network (LAN), a wide area network (WAN), a wireless local area network (WLAN) or other networks, and can control the display device 200 through an application corresponding to the display device 200. For example, the display device 200 can be controlled through an application running on a smart device. The application can provide various controls for the user on a screen related to a smart device through an intuitive user interface (UI).

Exemplarily, the mobile terminal 100B and the display device 200 can be both installed with software applications, so as to realize communication between the two through a network communication protocol, and further to realize one to one control operation and data communication. For example, a control instruction protocol can be established between the mobile terminal 100B and the display device 200, a remote control keyboard is synchronized to a mobile terminal 100B, and the function of controlling a display device 200 can be realized through controlling the user interface on the mobile terminal 100B; and audio and video contents displayed on the mobile terminal 100B can also be transmitted to a display device 200 to realize the function of synchronous display.

As shown in FIG. 1, the display device 200 can also communicate data with the server 300 through multiple communication manners. In embodiments of the present disclosure, the display device 200 is allowed to be in communication connection with the server 300 through a local area network, a wireless local area network or other networks. The server 300 can provide various contents and interactions to the display device 200.

Exemplarily, the display device 200 receives software application updates or accesses remotely stored digital media libraries through sending and receiving information and electronic program guide (EPG) interaction. The server 300 can be a group or multiple groups of servers, and can also be one or more types of servers. Video on demand and advertising services and other network services can be provided through a server 300.

The display device 200, on the one hand, can be a liquid crystal display, an OLED (Organic Light Emitting Diode) display, and a projection display device. On the other hand, the display device can be a display system composed of a smart television or a display and a set top box. The present disclosure does not intend to limit specific type, size and resolution ratio of the display device. Those skilled in the art should understand that some changes can be made to the performance and configuration of the display device 200 as required.

In addition to providing a broadcast reception television function, the display device 200 can further provide a computer supported intelligent network television function. Exemplarily, a network television, a smart television, an internet protocol television (IPTV) and the like are included. In some embodiments, the display device may not provide with broadcast reception television function.

As shown in FIG. 1, the display device connects with a camera or is configured with a camera, and is configured to present images captured by the camera on the display interface of the display device or another display device, to realize interactions between users. In some embodiments, the images captured by the camera can be displayed in full screen or half screen on the display device, or any optional area can be displayed.

As an alternative connection, the camera is connected with a rear shell of the display device through a connecting plate, and is fixed on the middle part of the upper side of the rear shell of the display. As for the installation manner, the camera can be amounted at any position of the rear shell of the display, as long as an image capture area of the camera is not shielded by the rear shell. For example, the image acquisition area covers the display direction of the display device.

As another alternative connection, the camera is connected with a rear shell of a display through a connecting plate or other suitable connectors in a way that is able to go up and go down. The connector is provided with a motor for moving up and down, when a user wants to use the camera or when an application wants to invoke the camera, the camera is being moved up above the display, and when the camera is not needed, the camera can be embedded into the rear shell, to protect the camera from being damaged.

As an embodiment, the camera used in the present disclosure can be of 16 megapixels, to achieve the purpose of ultrahigh definition display. In implementations, a camera with the pixels being greater than or lower than 16 megapixels can also be adopted.

When the display device has a camera, the contents displayed by the display device in different application scenarios can be combined in multiple different ways, to realize functions which cannot achieve by traditional display devices.

In some embodiments, a user may conduct video chat with at least one user while watching a video program. The video program window can be presented as a background, while the window of video chat can be displayed superposing the background. The function can be called as "chatting while watching".

In some embodiments, in "chatting while watching" context, at least one video chat with another terminal is conducted while live video or network video is being watched.

In some embodiments, a user can conduct a video chat with one or more other user while using an education application for learning. For example, a student can realize remote interaction with a teacher while learning via an education application. The function can be called as "chatting while learning".

In some embodiments, while a user is playing a card game, the user is able to have a video chat with other users from the same game. For example, after launching a game application to participate in the game, a player is able to interact with other players remotely. The function can be vividly called as "playing while watching".

In some embodiments, game scenarios are fused with video images, and the portrait in the video image is cutout and pasted on the face of a character in the game and displayed in the game image, thereby improving user experience.

In some embodiments, in motion-sensing games (such as ball games, boxing, running and dancing), through a camera, poses and movements of the users are acquired, and after detecting body movements and tracking and detecting of key data points of human skeleton, they can fuse with animation images in the game to realize games such as sports games and dance games.

In some embodiments, in a karaoke scenario, a user is able to video chat with at least one other user. The function can be vividly called as "singing while watching". In some embodiments, when at least one user launches the karaoke application during chatting, these multiple users can record a song together.

In some embodiments, a user can turn on a local camera to have images and videos captured, and the function can be vividly called as "looking in a mirror".

In some embodiments, additional functions can be included or the above functions can be excluded. The functions of the display device are not specifically defined in the present disclosure.

Figure 2:
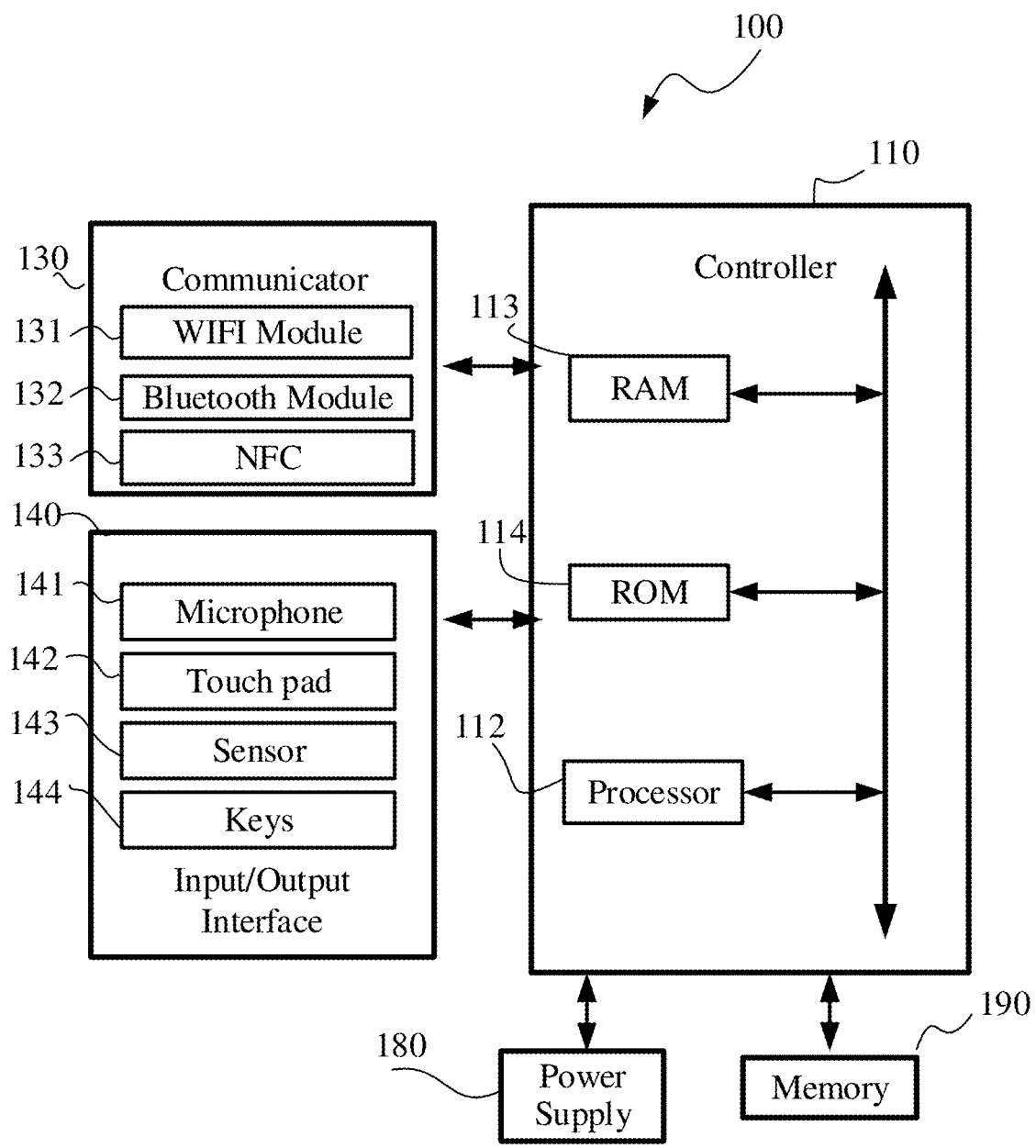
Figure 3:
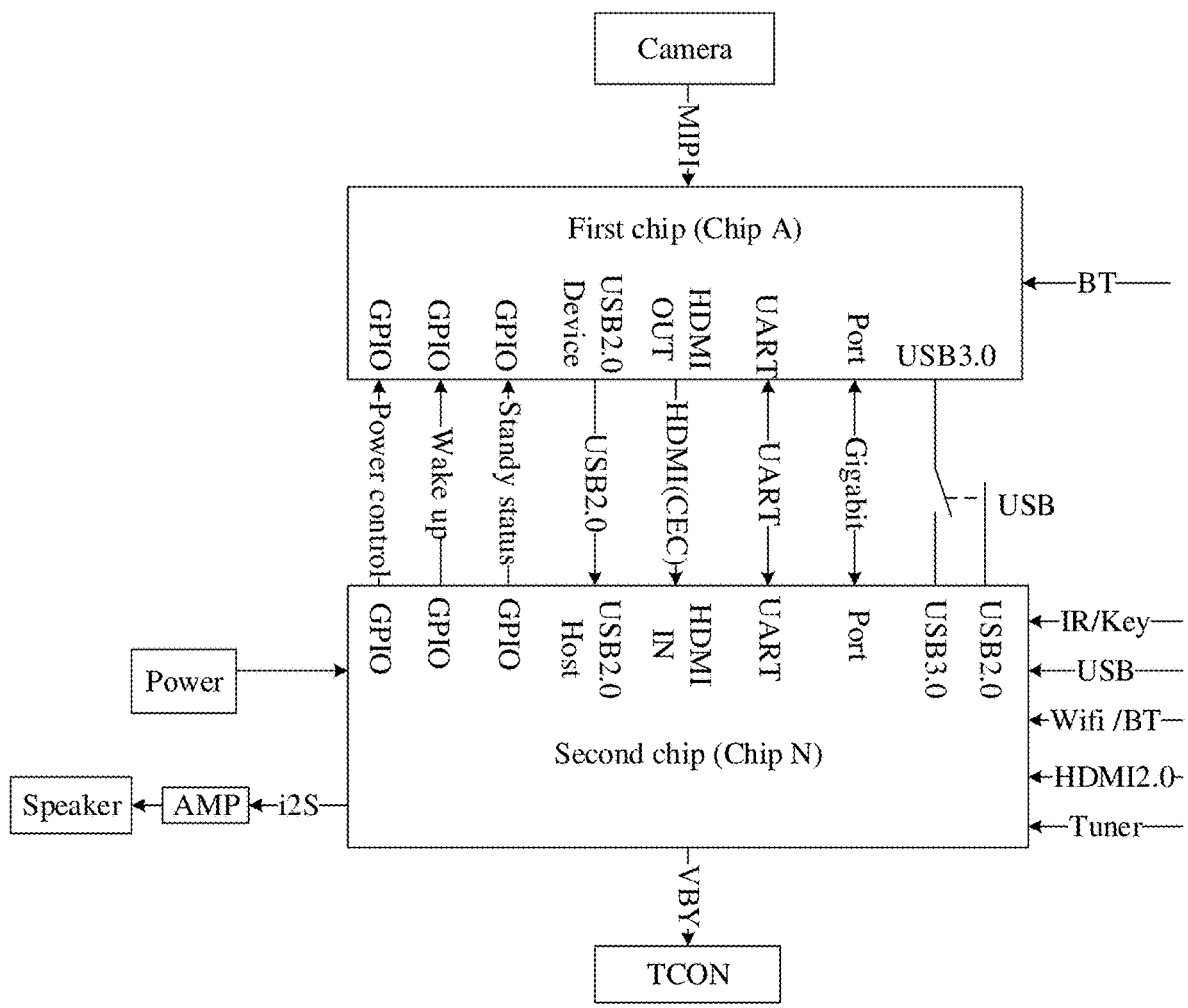

FIG. 2 schematically illustrates a block diagram of configuration of a control device 100 in an exemplary embodiment. As shown in FIG. 3, the control device 100 includes a controller 110, a communicator 130, a user input/output interface 140, a memory 190, and a power supply 180.

The control device 100 is configured to control the display device 200, receive operation instructions input from the user, and convert the operation instructions into instructions which can be recognized and responded by the display device 200, thereby functioning as an interaction intermediary between the user and the display device 200. For example, when the user operates the channel up/down buttons on the control device 100, the display device 200 responds to the channel up/down operations.

In some embodiments, the control device 100 can be an intelligent device. For example, the control device 100 can install various applications to control the display device 200 according to user requirements.

In some embodiments, as shown in FIG. 1, the mobile terminal 100B or other intelligent electronic device can act as the control device 100 after installing an application for controlling the display device 200. For example, through these applications, various functional buttons or icons on the graphical user interface of the mobile terminal 100B or other intelligent electronic device are provided for users, to realize the function of physical keys of the control device 100.

The controller 110 includes a processor 112, an RAM 113 and an ROM 114, a communication interface and a communication bus. The controller 110 is configured to control the running and operation of the control device 100, communication cooperation among internal parts, and external and internal data processing functions.

Under the control of the controller 110, the communicator 130 and the display device 200 realize communication of control signals and data signals. For example, the signals received from a user are sent to a display device 200. The communicator 130 can include at least one of a WiFi module 131, a Bluetooth module 132, an NFC module 133 and other communication modules.

In a user input/output interface 140, the input interface includes at least one of a microphone 141, a touch pad 142, a sensor 143, keys 144 and other input interfaces. For example, the user can input instructions through voice, touch, gesture, press and other actions, and the input interface converts received analog signals into digital signals and converts digital signals into corresponding instruction signals and sends to the display device 200.

The output interface includes an interface which sends received user instructions to the display device 200. In some embodiments, the output interface can be an infrared interface or a radio frequency interface. For example, if the output interface is an infrared signal interface, user input instructions need to be converted into infrared control signals according to an infrared control protocol, and then sent to the display device 200 through an infrared sending module. For another example, if the output interface is a radio frequency interface, user input instructions need to be converted into digital signals, modulated according to a modulation protocol of radio frequency control signals, and sent to the display device 200 through a radio frequency sending terminal.

In some embodiments, the control device 100 includes at least one of the communicator 130 and the output interface. The control device 100 is configured with a communicator 130, such as WiFi, Bluetooth, NFC and other modules, to send user input instructions to the display device 200 through WiFi protocol, or Bluetooth protocol, or NFC protocol encoding.

The memory 190 is configured to, under the control of the controller 110, store various running programs, data and applications for driving and controlling the control device 100. The memory 190 can store various control signal instructions input from the user.

The power supply 180 is configured to, under the control of the controller 110, provide operation power support for each element of the control device 100, and the power supply 180 can be batteries and related control circuits.

FIG. 3 exemplarily illustrates a block diagram of hardware configuration of a hardware system in a display device 200 in an exemplary embodiment.

When a dual-hardware system architecture is adopted, the structure relationship of the hardware system can be as shown in FIG. 3. For ease of description, a hardware system in the dual-hardware system architecture is referred to as the first hardware system or system A or chip A, and the other hardware system is referred to as the second hardware system or system N or chip N. Chip A includes a controller of chip A and various interfaces, while chip N includes a controller of chip N and various interfaces. Chip A and chip N can be respectively installed with a relatively independent operating system, the operating system of chip A and the operating system of chip N is able to communicate with each other through a communication protocol. Exemplarily, a framework layer of the operating system of chip A and the framework layer of the operating system of chip N can communicate to transmit commands and data, such that two independent but interrelated sub-systems exist in the display device 200.

As shown in FIG. 3, connection, communication and power supply between chip A and chip N can be realized through multiple different types of interfaces. The interface between chip A and chip N can include at least one of a general-purpose input/output (GPIO) interface, a USB interface, an HDMI interface and a UART interface. Chip A and chip N can use one or more of these interfaces for communication or power delivery. For example, as shown in FIG. 3, in a dual-hardware system architecture, an external power can supply power to chip N, and chip N further serves as a power supply for supplying power to chip A.

In addition to interfaces to connect chip N, chip A further includes interfaces configured to connect other devices or components, such as an MIPI interface to connect a camera, a Bluetooth interface and the like as shown in FIG. 3.

Similarly, in addition to interfaces to connect with chip A, chip N can further include a VBY interface configured to connect with TCON (Timer Control Register) of a display screen, an i2S interface configured to connect with a power amplifier (AMP) and a loudspeaker (Speaker), and an IR/Key interface, a USB interface, a WiFi interface, a Bluetooth interface, an HDMI interface, and a Tuner interface, etc.

Figure 4:
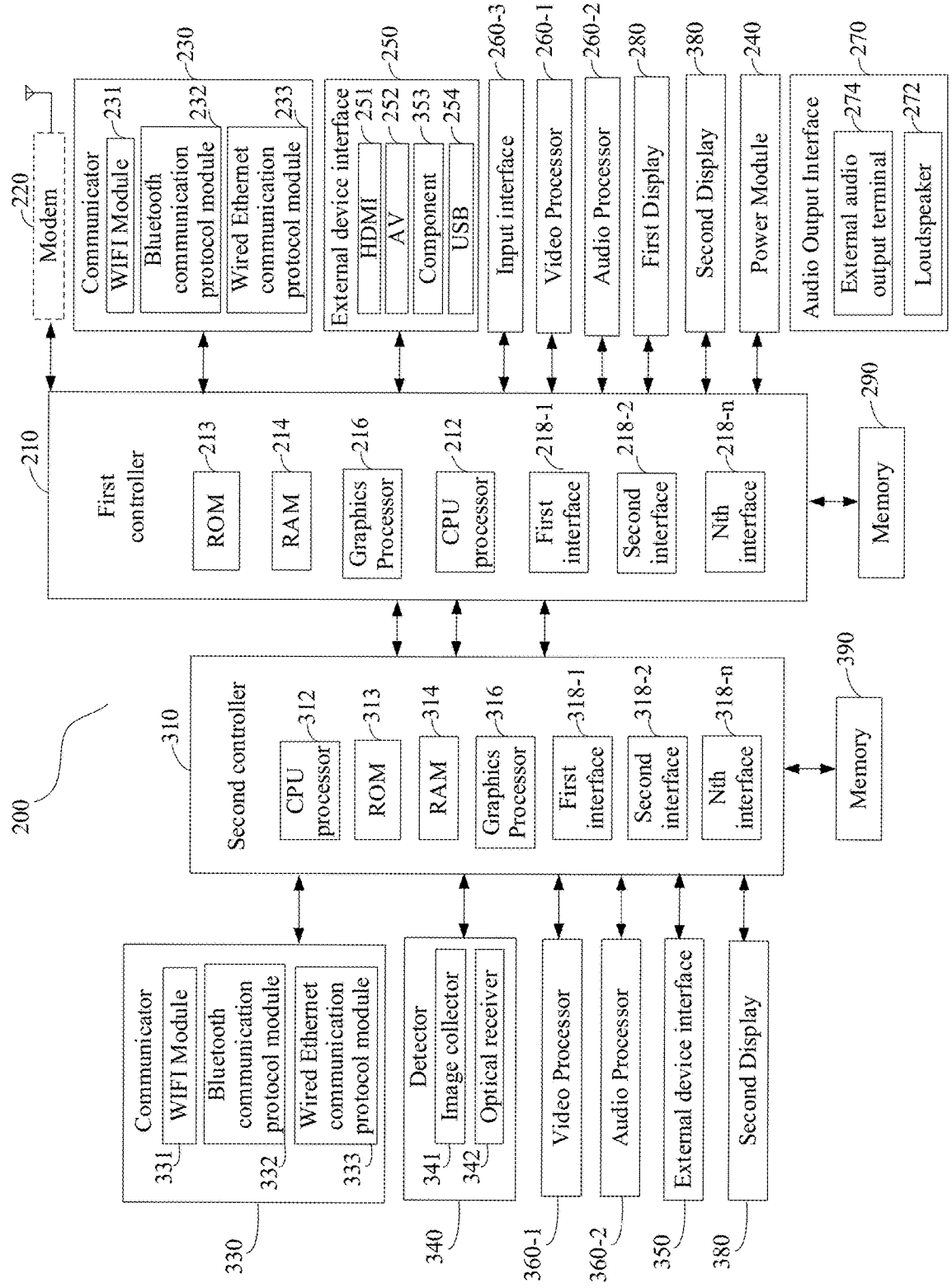

The dual-hardware system architecture in the present disclosure will be further described below in combination with FIG. 4. It should be noted that, FIG. 4 is merely an exemplary illustration of the dual-hardware system architecture of the present disclosure, rather than a limitation to the present disclosure. In implementations, two hardware systems can both include more hardware modules or less hardware modules or interfaces as required.

FIG. 4 exemplarily illustrates a block diagram of hardware architecture of a display device 200 in FIG. 3. As shown in FIG. 4, the hardware system of the display device 200 can include chip A and chip N, and modules connected with chip A or chip N through various interfaces.

Chip N can include at least one of a modem 220, a communicator 230, an external device interface 250, a controller 210, a memory 290, a user input interface, a video processor 260-1, an audio processor 260-2, a display 280, an audio output interface 272, and a power supply. In other embodiments, chip N can also include more modules or less modules.

Here the modem 220 is configured to receive broadcast signals in a wired or wireless manner, and then perform modulation and demodulation process such as amplification, frequency mixing and resonance, in order to demodulate the audio and video signals carried in the frequency wave of the television channel selected by the user and additional information (such as EPG data signals) from multiple wired or wireless broadcast television signals. According to the broadcasting system of different television signals, the modem 220 has many signal types, such as terrestrial broadcasting, wired broadcasting, satellite broadcasting or internet broadcasting. According to different modulation types, the signal modulation mode can be either a digital modulation mode or an analog modulation mode. According to different types of received television signals, the modem 220 can demodulate analog signals and/or digital signals.

The modem 220 is further configured, according to user selection and under the control of the controller 210, to respond to television channel frequency selected by a user and the television signals carried by the frequency wave.

In some other exemplary embodiments, the modem 220 can also be in an external device, for example, an external set top box. In this way, the set top box outputs television audio and video signals after modulation and demodulation, and inputs the television audio and video signals to the display device 200 through an external device interface 250.

The communicator 230 is a component configured to communicate with an external device or an external server according to various communication protocol types. For example, the communicator 230 can include a WiFi module 231, a Bluetooth communication protocol module 232, a wired Ethernet communication protocol module 233, an infrared communication protocol module and other network communication protocol modules or near-field communication protocol modules.

The display device 200 can establish connections for control signal and data signal with an external control device or a content providing device through a communicator 230. For example, the communicator can receive control signals from the remote control 100 under the control of a controller.

The external device interface 250 is a component which provides data transmission between a controller 210 of the chip N, and a chip A and other external devices. The external device interface can be connected with an external device such as a set top box, a gaming device and a notebook computer in a wired/wireless manner, and can receive such data as video signals (for example, motion image), audio signals (for example, music) and additional information (for example, EPG) of an external device.

Here the external device interfaces 250 can include: any one or more of a high definition multimedia interface (HDMI) terminal 251, a composite video blanking synchronization (CVBS) terminal 252, an analog or digital component terminal 253, a universal serial bus (USB) terminal 254, and a red, green and blue (RGB) terminal (not shown in the figure). The number and type of interfaces of the external device are not limited in the present disclosure.

The controller 210 controls the operation of the display device 200 and responds to the operation of the user through running various software control programs (such as an operating system and/or various applications) stored on the memory 290.

As shown in FIG. 4, the controller 210 includes a read-only memory (ROM) 213, a random access memory (RAM) 214, a graphics processor 216, a CPU processor 212, a communication interface 218, and a communication bus. Here, the ROM 213, the RAM 214, the graphics processor 216, the CPU processor 212 and the communication interface 218 are connected through a bus.

The ROM 213 is configured to store various system start instructions. For example, upon receiving a power on signal, the power supply of the display device 200 begins to start, the CPU processor 212 runs the system initialization instructions in the ROM, and copies the temporary data generated by the operating system stored in the memory 290 to an RAM 214, to run or start the operating system. After the operating system is started, the CPU processor 212 copies temporary data generated by various applications in the memory 290 to the RAM 214, and then runs or launches various applications.

The graphics processor 216 is configured to generate various graphic objects, such as icons, menus for operations and display graphics for user input instruction, etc. An arithmetic unit is included, and the arithmetic unit operates through receiving various interactive instructions input from the user, and displays various objects according to display attributes. A renderer is included, and the renderer is configured to generate various objects obtained based on the arithmetic unit, and display the rendered results on the display 280.

The CPU processor 212 is configured to execute operating systems and application instructions stored in the memory 290, and execute various applications, data and contents according to received various interactive instructions input externally, to finally display and play various audio and video contents.

In some exemplary embodiments, the CPU processor 212 can include multiple processors. Multiple processors can include one master processor and one or more sub-processor. The master processor is configured to perform some operations of the display device 200 in a precharging mode, and/or display the pictures in a normal mode. One or more sub-processor is configured to perform a type of operation in a standby mode.

A communication interface can include a first interface 218-1 to the $n^{th}$ interface 218-$n$. These interfaces can be network interfaces connected to an external device via a network.

The controller 210 can control the overall operation of the display device 200. For example, in response to receiving user commands for select the UI objects displayed on the display 280, the controller 210 will perform operations related to an object selected by user commands.

Here the object can be any one of available objects for selection, such as a hyperlink or an icon. The operations related to selected objects for example include: operations for displaying the hyperlinked page, document or image, or operations for launching applications corresponding to icons. User commands for selecting a UI object can be commands input from various input devices (for example, a mouse, a keyboard, a touch pad, etc.) connected to the display device 200 or voice commands corresponding to voices from the user.

The memory 290 is configured to store various software modules for driving and controlling the display device 200. For example, various software modules stored in the memory 290 include a basic module, a detection module, a communication module, a display control module, a browser module and various service modules.

Here, the basic module is an underlying software module for signal communication between respective hardwares in the display device 200 and for sending processing and controlling signals to an upper layer module. The detection module is a management module configured to collect various types of information from various sensors or the user input interfaces and perform digital-to-analogue conversion and analysis management.

For example, a voice recognition module includes a voice analysis module and a voice instruction database module. The display control module is a module configured to control the display 280 to display image, and can be configured to play multimedia image and UI interface and other information. The communication module is a module configured to perform control and data communication with an external device. The browser module is a module configured to perform data communication between browsing servers. The service module is a module configured to provide various services and various applications.

Meanwhile, the memory 290 is further configured to store received external data and user data, images of respective items in various user interfaces, and visual effect pictures of focus objects, etc.

The user input interface is configured to send input signals from a user to the controller 210, or transmit signals output from a controller to the user. Exemplarily, the control device (for example, a mobile terminal or a remote control) can send input signals, such as power on or power off signals, channel selection signals and volume adjustment signals, input from the user to the user input interface, and then transmit the input signals to the controller through the user input interface. Or, the control device can receive output signals such as audios, videos or data processed by the controller and output through the user input interface, and display the received output signals or output the received output signals in an audio or vibration form.

In some embodiments, the user can input user commands to the graphical user interface (GUI) displayed on the display 280, and the user input interface receives user input commands through the graphical user interface (GUI). Or, the user can input user commands by inputting voices or gestures, then the user input interface receive the user input commands through voices or gestures recognition by a sensor.

The video processor 260-1 is configured to receive video signals, and perform video data processing such as decompressing, decoding, scaling, noise reduction, frame rate conversion, resolution ratio conversion and image synthesis according to a standard coding and decoding protocol of input signals, to obtain video signals which can be directly displayed or played on the display 280.

Exemplarily, the video processor 260-1 includes a demultiplexing module, a video decoding module, an image synthesis module, a frame rate conversion module, and a display formatting module, etc.

Here the demultiplexing module is configured to perform demultiplexing on the input audio and video data streams, for example, when an MPEG-2 signal is input, then the demultiplexing module demultiplexes the input MPEG-2 signal into video signals and audio signals.

A video decoding module is configured to process video signals after demultiplexing, where the processing includes decoding and scaling, etc.

The image synthesis module, such as an image synthesizer, is configured to superimpose and mix the GUI signals with the scaled video images, to generate an image signal for display. Here the GUI signals are generated by the graphics generator according to user input or generated by the graphics generator itself.

The frame rate conversion module is configured to convert the frame rate of the input videos, for example, the frame rates of 24 Hz, 25 Hz, 30 Hz and 60 Hz of the input videos are converted into frame rates of 60 Hz, 120 Hz or 240 Hz. Here the input frame rate can be related to the source video streaming, and the output frame rate can be related to the refreshing rate of the display. The input has an ordinary format, such as frame interpolation method.

The display formatting module is configured to convert signals output from the frame rate conversion module into signals with format conforming to the display format of a display. For example, format conversion is performed on the signals output from the frame rate conversion module to output RGB data signals.

In some embodiments, the video processor and the graphics processor can be integrated into a chip together. In some embodiments, the functional modules of the graphics processor and the video processor can be configured according to requirements.

The display 280 is configured to receive image signals input from the video processor 260-1, and display video contents and images and a menu control interface. The display 280 includes a display component configured to display pictures and a driving component configured to drive image display. The displayed video can be videos in the broadcast signals received from modem 220, and can also be video input from the communicator or the external device interface. The display 220 can simultaneously display the user control interface (UI) generated in the display device 200 and configured for controlling the display device 200.

In some embodiments, there are different types of display. The display 280 can further include a driving component for driving display. Or, if the display 280 is a projection display, the display 280 can further include a projection device and a projection screen.

The audio processor 260-2 is configured to receive audio signals, and perform decompressing and decoding, and noise suppression, digital-to-analogue conversion, amplification and other audio data processing according to a standard encoding and decoding protocol of input signals, to obtain audio signals for play in the loudspeaker 272.

The audio output interface 270 is configured to receive audio signals output from the audio processor 260-2 under the control of the controller 210. The audio output interface can include a loudspeaker 272, or an external audio output terminal 274 configured for outputting to the sound generator of the external device. For example, the external audio output terminal can be an external audio terminal or an headphone output terminal, etc.

In some other exemplary embodiments, the video processor 260-1 can include one or more chips. The audio processor 260-2 can also include one or more chips.

In addition, in some other exemplary embodiments, the video processor 260-1 and the audio processor 260-2 are made of separate chips, and can also be integrated into one or more chips together with the controller 210.

The power supply is configured to, under the control of the controller 210, provide power to the display device 200 by the power input from the external power supply. The power supply can include an internal power circuit installed inside the display device 200. Also, the power supply can be an external power installed outside the display device 200, accordingly a power interface for an external power is provided in the display device 200.

Similar to chip N, as shown in FIG. 4, chip A includes a controller 310, a communicator 330, a detector 340 and a storage 390. In some embodiments, chip A further includes a user input interface, a video processor, an audio processor, a display, and an audio output interface. In some embodiments, there is an individual power supply for providing power to chip A.

The communicator 330 is a component for communicating with an external device or an external server according to various types of communication protocol. For example, the communicator 330 includes a WiFi module 331, a Bluetooth communication protocol module 332, a wired Ethernet communication protocol module 333, an infrared communication protocol module and other network communication protocol modules or near-field communication protocol modules.

The communicator 330 in chip A has interactions with the communicator 230 in chip N. For example, the WiFi module 231 in the hardware system of chip N is configured to connect an external network and establish network communication with an external service, etc. The WiFi module 331 in chip A is configured to connect to the WiFi module 231 in the hardware system of chip N, instead of being directly connected with an external network. As such, chip A is connected with an external network through chip N. Therefore, for the user, a display device in the above embodiment can display WiFi account information available for use.

The detector 340 is a component for collecting signals about external environment or interactions with outside. The detector 340 can include an optical receiver 342 which is a sensor for collecting ambient light intensity and the display parameters can adapt according to the collected ambient light. Further, the detector 340 can include an image collector 341, such as a camera, a webcam and the like. The image collector 341 is configured to collect external environment scenes, collect user attribute or gestures of the user, so that the display parameters can change accordingly and user gestures can be recognized, to allow the interactions with users.

The external device interface 350 is a component for data transmission between the controller 310 and chip N or other external devices. The external device interface can be connected with external devices such as a set top box, a gaming device and a notebook computer in a wired/wireless manner.

The controller 310 controls the operation of the display device 200 and responds to the operation of the user through running various software control programs (such as installed third-party applications) stored on the memory 390 and through interaction with chip N.

As shown in FIG. 4, the controller 310 includes a read-only memory (ROM) 313, a random access memory (RAM) 314, a graphics processor 316, a CPU processor 312, a communication interface 318, and a communication bus. Wherein, the ROM 313, the RAM 314, the graphics processor 316, the CPU processor 312 and the communication interface 318 are connected through a bus.

The ROM 313 is configured to store various system startup instructions. The CPU processor 312 runs the system startup instructions in the ROM, and copies the temporary data stored in the operating system of the memory 390 to an RAM 314, to run or start an operating system. After the operating system is started, the CPU processor 312 copies temporary data of various applications in the memory 390 to the RAM 314, to run or launch various applications.

The CPU processor 312 is configured to run operating systems and application instructions stored in the memory 390, perform communication, signal, data, instruction and other transmission and interaction with chip N, and run various applications, data and contents according to received various interactive instructions input externally, to finally display and play various audio and video contents.

A communication interface can include a first interface 318-1 to the n$^{th}$ interface 318-n. These interfaces can be network interfaces connected to an external device via a network, and can also be network interfaces connected to chip N via the network.

The controller 310 is able to control the overall operation of the display device 200. For example, in response to receiving the user commands for selecting the UI objects displayed on the display 280, the controller 210 will perform operations related to the object selected by the user's commands.

The graphics processor 316 is configured to generate various graphic objects, such as icons, menus for operation and display graphics for user instruction input, etc. An arithmetic unit is included, and the arithmetic unit operates through receiving various interactive instructions input from the user, and displays various objects according to display attributes. A renderer is included, and the renderer is configured to generate various objects obtained based on the arithmetic unit, and display the rendered results on the display 280.

The graphics processor 316 in chip A and the graphics processor 216 in chip N can both generate various graphic objects. If application 1 is installed in chip A, and application 2 is installed in chip N, when the user is on an interface of application 1, and the user inputs instructions for application 1, then the graphics processor 316 in chip A generates graphic objects. When the user is on an interface of application 2, and the user inputs instructions for application 2, the graphics processor 216 in chip N generates graphic objects.

Figure 5:
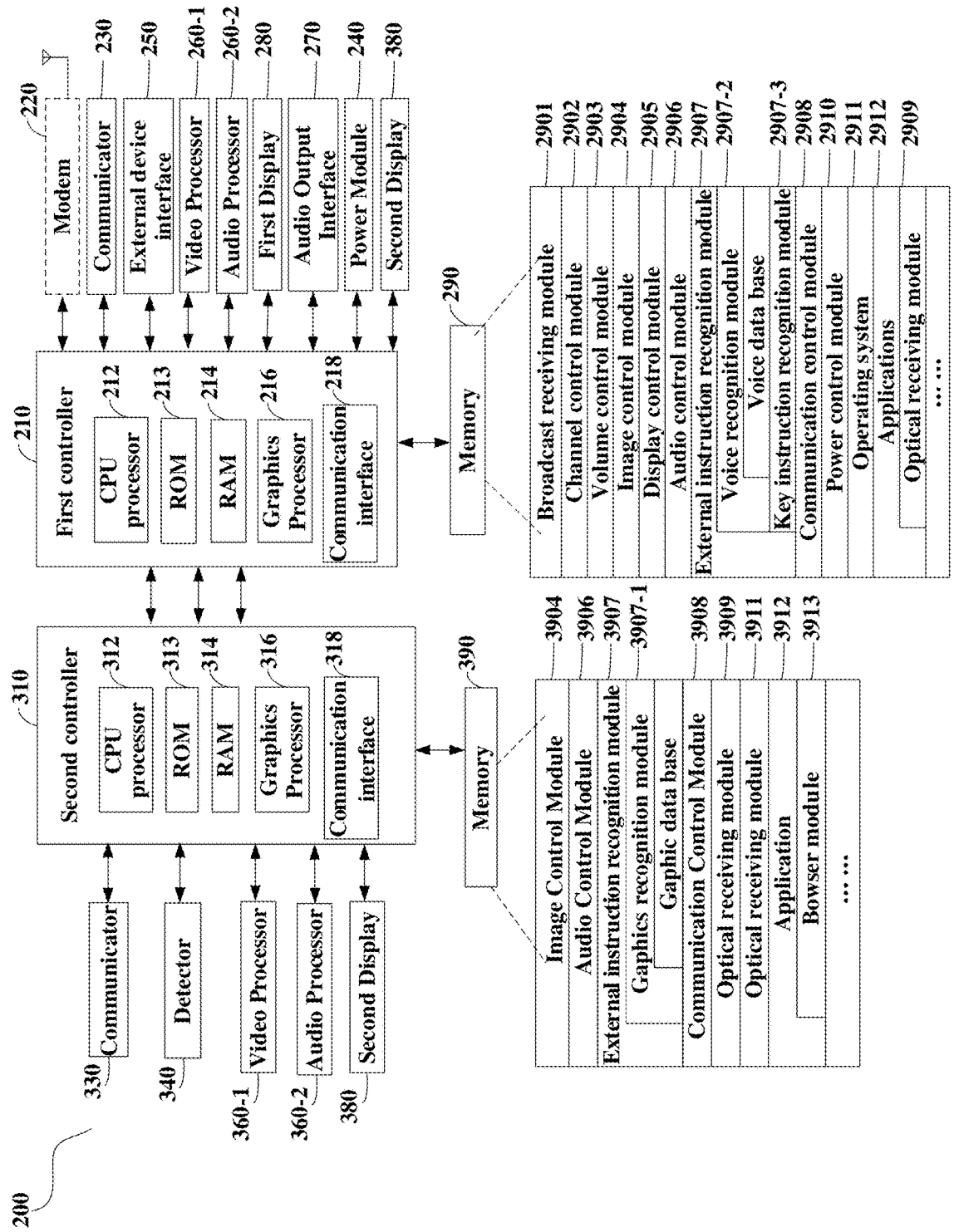

FIG. 5 exemplarily illustrates a schematic diagram of function configuration of a display device in an exemplary embodiment.

As shown in FIG. 5, the memory 390 in chip A and the memory 290 in chip N are respectively configured to store the operating system, applications, contents and user data, etc., and drive the system of the display device 200 and respond to various operations of the user under the control of the controller 310 of chip A and the controller 210 of chip N. The memory 390 in chip A and the memory 290 in chip N can include a volatile and/or a nonvolatile memory.

As to chip N, the memory 290 is specifically configured to store running programs for driving the controller 210 in the display device 200, and store various applications in the display device 200, various applications downloaded by the user from external devices, various graphical user interfaces related to applications, various objects related to graphical user interfaces, user data information and various internal data supporting applications. The memory 290 is configured to store a kernel, a middleware, applications and other system software of an operating system (OS), and store input video data and audio data, and other user data.

The memory 290 is configured to store the video processor 260-1 and the audio processor 260-2, the display 280, the communication interface 230, the modem 220, an input/output interface and other driving programs and related data.

In some embodiments, the memory 290 can store software and/or programs, and software applications for an operating system (OS) include: for example, a kernel, a middleware, an application programming interface (API) and/or applications. Exemplarily, the kernel is used to control or manage system resources, or functions implemented by other programs (for example, the middleware, the API or applications). The kernel provides an interface, to allow the middleware and the API or applications to access the controller, to control or manage system resources.

Exemplarily, the memory 290 includes a broadcast receiving module 2901, a channel control module 2902, a volume control module 2903, an image control module 2904, a display control module 2905, an audio control module 2906, an external instruction recognition module 2907, a communication control module 2908, an optical receiving module 2909, a power control module 2910, an operating system 2911 and other applications 2912 and a browser module, etc. Through running various software applications in the memory 290, the controller 210 execute broadcast television signal reception and demodulation, television channel selection control, volume selection control, image control, display control function, audio control, external instruction recognition, communication control, optical signal reception, power control, software control platforms supporting various functions, and browser function.

The memory 390 is configured to store various software modules for driving and controlling the display device 200. For example, various software modules stored in the memory 390 include a basic module, a detection module, a communication module, a display control module, a browser module and various service modules. Since the functions of the memory 390 are similar to the functions of the memory 290, the related parts of the memory 390 can be referred to the memory 290 and will omit herein.

Exemplarily, the memory 390 includes an image control module 3904, an audio control module 3906, an external instruction recognition module 3907, a communication control module 3908, an optical receiving module 3909, an operating system 3911 and other applications 3912 and a browser module 3913, etc. Through running various software applications in the memory 390, the controller 310 performs such functions as image control, display control, audio control, external instruction recognition, communication control, optical signal reception, power control, software control platforms supporting various functions, and browser function.

As for the difference, the external instruction recognition module 2907 in chip N and the external instruction recognition module 3907 in chip A can recognize different instructions.

Exemplarily, since an image receiving device such as a camera is connected with chip A, the external instruction recognition module 3907 in chip A can include an image recognition module 3907-1. The image recognition module 3907-1 stores a graphic database, when the camera receives external graphic instructions, the received graphic instructions are matched with the instructions in the graphic database, to control the display device according to instructions. Since the voice receiving device and the remote control are connected with chip N, the external instruction recognition module 2907 in chip N can include a voice recognition module 2907-2, the voice recognition module 2907-2 stores a voice database, when the voice receiving device receives external voice instructions, the received external voice instructions are matched with the instructions in the voice database, to control the display device according to instructions. Similarly, the remote control and other control devices 100 are connected with chip N, and instructions are interchanged between a button instruction recognition module and the control device 100.

Figure 6A:
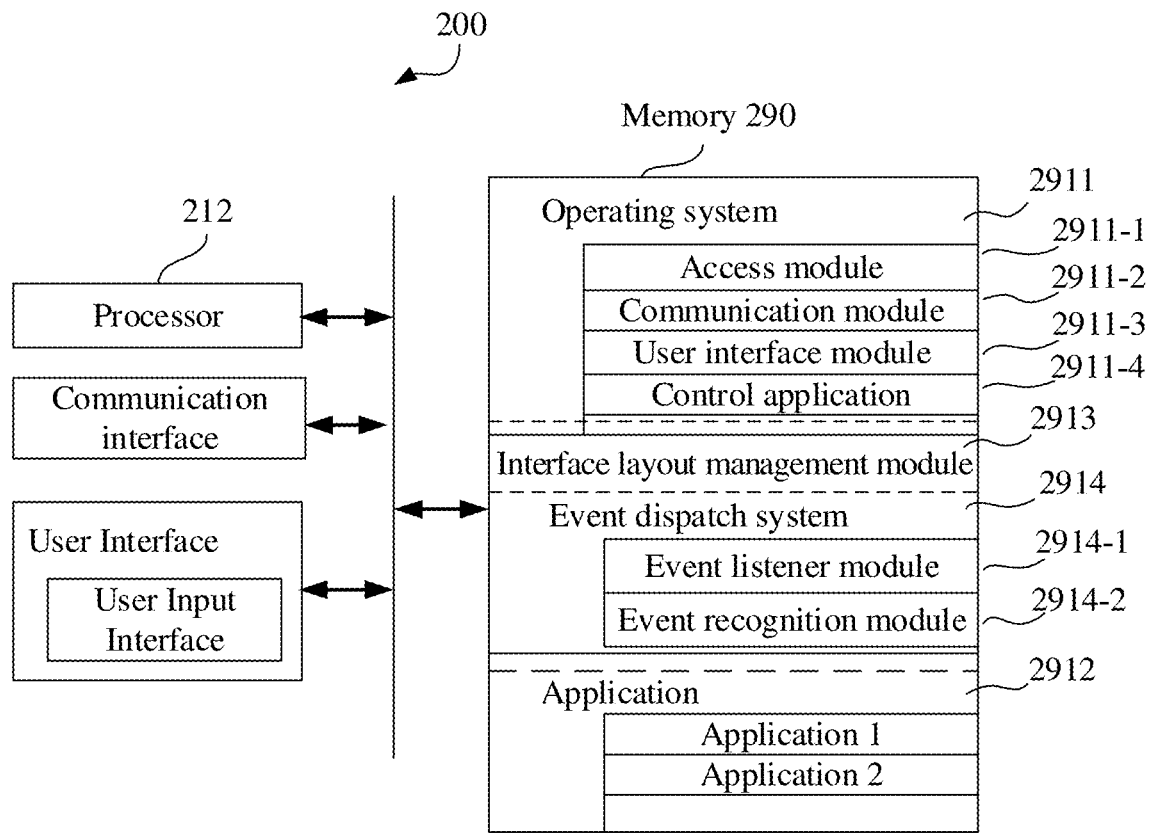

FIG. 6A exemplarily illustrates the block diagram of configuration of a software system in the display device 200 in the exemplary embodiment.

As to chip N, as shown in FIG. 6A, the operating system 2911 includes operating software for processing various basic system services and perform hardware-related tasks.

In some embodiments, part of the kernel of the operating systems includes a series of software for managing hardware resources of the display device, and providing service to other programs or software codes.

In some other embodiments, part of the kernel of the operating systems includes one or more device drivers. The device driver can be a group of software codes in the operating system to help to operate or control devices or hardware related to the display device. The driver can include codes for operations on videos, audios and/or other multimedia components. Exemplarily, a display, a camera, Flash, WiFi and an audio driver are included.

Here the access module 2911-1 is configured to modify or access applications, to realize access of applications and operations of the displayed contents.

The communication module 2911-2 is configured to connect with other external devices via related communication interface and communication network.

A user interface module 2911-3 is configured to provide objects on the user interface, to allow access of various applications and operations of the user.

The control application 2911-4 is configured to control process management and includes running time applications, etc.

An event dispatch system 2914 can be implemented in the operating system 2911 or the application 2912. In some embodiments, the event dispatch system 2914 is implemented in the operating system 2911 and the application 2912, and is configured for monitoring various user input events, and performs a set or several sets of predefined operations according to results of recognized responses corresponding to various events or sub-events.

Here the event listener module 2914-1 is configured to listen to events or sub-events input through the user input interface.

The event recognition module 2914-2 is configured to recognize various events or sub-events according to the definitions of various events input through various user input interfaces, and dispatch the events or sub-events to a processor to execute the corresponding one or more sets of processing programs.

Here the event or sub-event refers to the input detected by one or more sensors in the display device 200, and the input of an external control device (for example, a control device 100 and the like). For example, various sub-events input by voice, gesture input sub-events for gesture recognition, and sub-events input via remote key of a control device. Exemplarily, the one or more sub-events of the remote control include various forms, and include but not limited to one or a combination of operations including pressing up/down/left/right key, ok key, and a pressing and holding operation. The one or more sub-events also include operations of non-physical keys, such as moving, holding, releasing, etc.

The interface layout management module 2913 is configured to directly or indirectly receive various user input events or sub-events monitored by the event dispatch system 2914, to update the layout of a user interface. The update includes but not limited to updating positions of respective controls or child controls on the interface, size or position of a container, and hierarchy, and various other operations related to interface layout.

Since the function of the operating system 3911 in chip A is similar to the function of the operating system 2911 in chip N, the related parts can refer to the operating system 2911 and will omit herein.

Figure 6B:
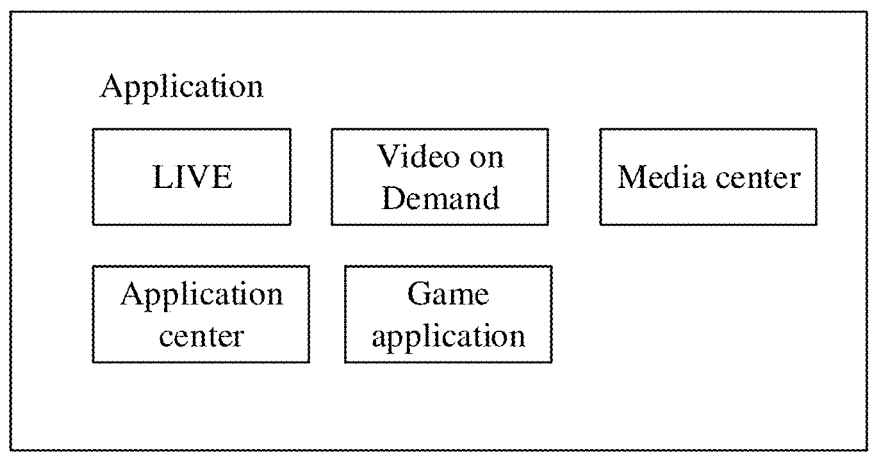

As shown in FIG. 6B, the application layer of the display device includes various applications executable in the display device 200.

The application layer 2912 of chip N includes but not limited to one or more applications, for example, a video on demand application, an application center, a game application, etc. The application layer 3912 in chip A includes but not limited to one or more applications, such as a live television application and a media center application, etc. It should be noted that, chip A and chip N respectively contain applications according to the operating system and other designs, and the specific definition and the classification of the applications are not intend to limit herein.

The live television application can provide live television through different signal sources. For example, the live television application can provide television signals using input from cable television, radio broadcast, satellite service or other types of live television services. In addition, the live television application can display videos of live television signals on the display device 200.

The video on demand application can provide videos from different storage sources. Different from the live television application, the video on demand provides video display from some storage sources. For example, the video on demand can come from a server side of cloud storage, and a local hard disk storage containing stored video programs.

The media center application is an application which can play various multimedia contents. For example, the media center is different from live television or video on demand, and the user is able to access various images or services provided by audios through the media center application.

The application center can store various applications. The application can be a game application, an application, or some other applications related to the computer system or other devices but capable of running in the display device. The application center can acquire these applications from different sources, and store them in the local memory, and then the applications can run on the display device 200.

In some embodiments, the operating system includes a kernel, a database, a frame layer and an application layer, and the above applications are all applications in the application layer.

Figure 7:
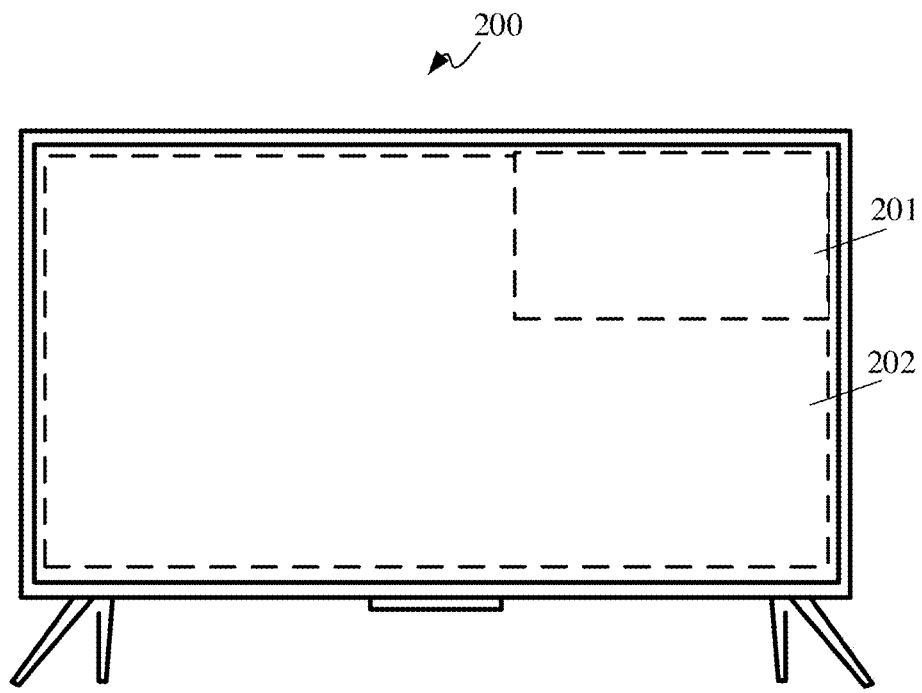

FIG. 7 exemplarily illustrates the schematic diagram of a user interface of a display device 200 in an exemplary embodiment. As shown in FIG. 7, the user interface includes multiple view display areas. For example, a first view display area 201 and a playing image 202 are included, where the playing image includes the layout of one or more different items. The user interface further includes a selector for indicating the items being selected, and the position of the selector can be moved through user input, to select different items by changing the positions.

It should be noted that, multiple view display areas can present display images in different layers. For example, the first view display area can present the item contents of video chat, while the second view display area can present the item contents of an application layer (for example, webpage video, VOD display, and application pictures and the like).

Alternatively, presentations of different view display areas have different priorities, and view display areas with different priorities have different display priorities. For example, the priority of the system layer is higher than the priority of an application layer. When the user uses the acquisition selector and image switching in the application layer, the image display of the view display area of the system layer is not shielded; moreover, when the size and position of the view display area of the application layer are changed according to the selection of the user, the size and position of the view display area of the system layer are not influenced.

The presentation for display images with the same hierarchy can also be presented, at this time, the selector can switch between the first view display area and the second view display area, and when the size and position of the first view display area are changed, the size and position of the second view display area are changed correspondingly.

Chip A and chip N may be respectively installed with independent operating systems, such that two independent but interconnected sub-systems exist in the display device 200. For example, chip A and chip N can both be installed with android OS and various APPs, such that each chip can implement certain functions, and chip A and chip N can collaboratively implement a certain function.

In the present disclosure, a method of performing video call is provided, such that an authorized account is able to establish video connection with the display device directly, without operation of the display device (serving as an invitee device), thereby simplifying the process of establishing video calls. The scheme according to the present disclosure can be used not only in a dual-chip display device or a multi-chip display device, but also in a single-chip display device.

In some embodiments, a camera is arranged on a display device which serves as an invitee of the video call, and an initiating device of the video call can be a mobile terminal, and can also be another display device. In some embodiments, the display device is a smart television, or the display device is a system comprising a display and a set top box.

In some embodiments, a mobile terminal is taken as an example of an initiating party of a video request. The mobile terminal installs corresponding APPs, for example, at least one of Juhaokan (TV management APP), Xiaojuzaijia (home security APP) and Haijian (chat APP). The initiation of a video call request on the mobile terminal is done by user launching a corresponding application and clicking a control for video call on the application. And the mobile terminal sends a video call request to a server. The video call request at least includes one of a unique identifier of the display device or account information at the television side, and further includes account information at the mobile terminal side. The video call request is configured to request the display device to transmit to the mobile terminal the image information acquired by the camera on the display device and the sound information acquired by the microphone. The unique identifier of the display device or the account information at the television side can serve as identification information for the display device, also referred to as the first identification information. The account information at the mobile terminal side serves as identification information for the mobile terminal, also referred to as the second identification information.

After receiving a video call request, the server sends a push message to the television side according to the first identification information. Here the push message includes the first identification information and/or the second identification, and the push message is configured to trigger the display device to verify the validity of the mobile terminal.

In some embodiments, after receiving the video call request, the server sends a push message to the television according to the account information at the television side and/or the unique identifier of the display device. The push message at least includes one of the unique identifier of the display device, the account information at the television side, and the account information at the mobile terminal side.

In some embodiments, the server can perform authentication first and then send push message to the display device, such that the terminal is able to directly create a call process after the determination based on the push message. Specifically, the authentication process includes determining whether the identifier of the display device or the account information at the television side in the video call request grants direct video call with the account at the mobile terminal side, and then a push message and a notification message for indicating successful authentication will be sent. Establish.

In response to the push message, the display device automatically creates a video call process.

In some embodiments, said automatically creating, by the display device, a video call includes: sending, by the display device, an authentication request to the server according to the unique identifier of the display device and/or the currently logged account; determining, by the server, whether the mobile terminal is authorized by the television device according to a preset corresponding relationship in response to the authentication request; and automatically creating, by the display device, the video call process in response to a message for indicating a successful authorization.

In some embodiments, when the display device determines that the account of the television and/or the unique identifier of the display device in the push request consists with the currently logged account of the display device or the unified identifier of the current display device, the display device automatically establishes the video call process in response to the message for indicating a successful authorization.

In some embodiments, the server sends the push message when authentication is successful, and does not send the push message when the authentication is a failure. Therefore, the display device can automatically establish the video call process when it is determined that the account information at the television side and/or the unique identifier of the display device in the push request consists with the currently logged account of the display device or the unique identifier of the current display device directly according to the push message.

In some embodiments according the present disclosure, the display device is installed with a first video associated application (such as Xiaojuzaijia). A second video associated application (such as Haijian) can also be included in the first video application, and other applications associated with a camera (for example, game applications such as chess and card games associated applications, or a camera application with image capturing as the main function, or a mirror application) can also be included in the first video associated application.

In the functioning process, the mobile terminal needs to acquire the authorization of the display device first. The authorization process can be a process that: the display device presents a two-dimensional code to invite the mobile terminal to acquire the display device ID, the mobile terminal acquires the ID of the display device after scanning the two-dimensional code and presents the ID information of the display device on the UI interface, and after the user selects "Binding" on the mobile terminal, the server binds the current account information on the mobile phone with the ID of the display device. In some embodiments, the ID of the display device can be replaced by the account information logged on the display device, and the server binds the current account information on the mobile phone with the account information logged on the display device. In some embodiments, the two-dimensional code can simultaneously include the account information logged on the display device and the ID of the display device.

In some embodiments, in the authorization process of the display device, the account information logged on the display device is required to be the same as the account information logged on the mobile terminal, and then the ID binding of the display device can be done.

In some embodiments, the authentication corresponding relationship established after binding can be stored on the server, and can also be stored in the display device. The authentication corresponding relationship can include at least one of: the corresponding relationship between the current account information on the mobile phone and the ID of the display device, the corresponding relationship between the current account information on the mobile phone and the account information logged on the display device, and the corresponding relationship between the account information logged on the display device and the ID of the display device and the current account information on the mobile terminal.

Figure 10A:
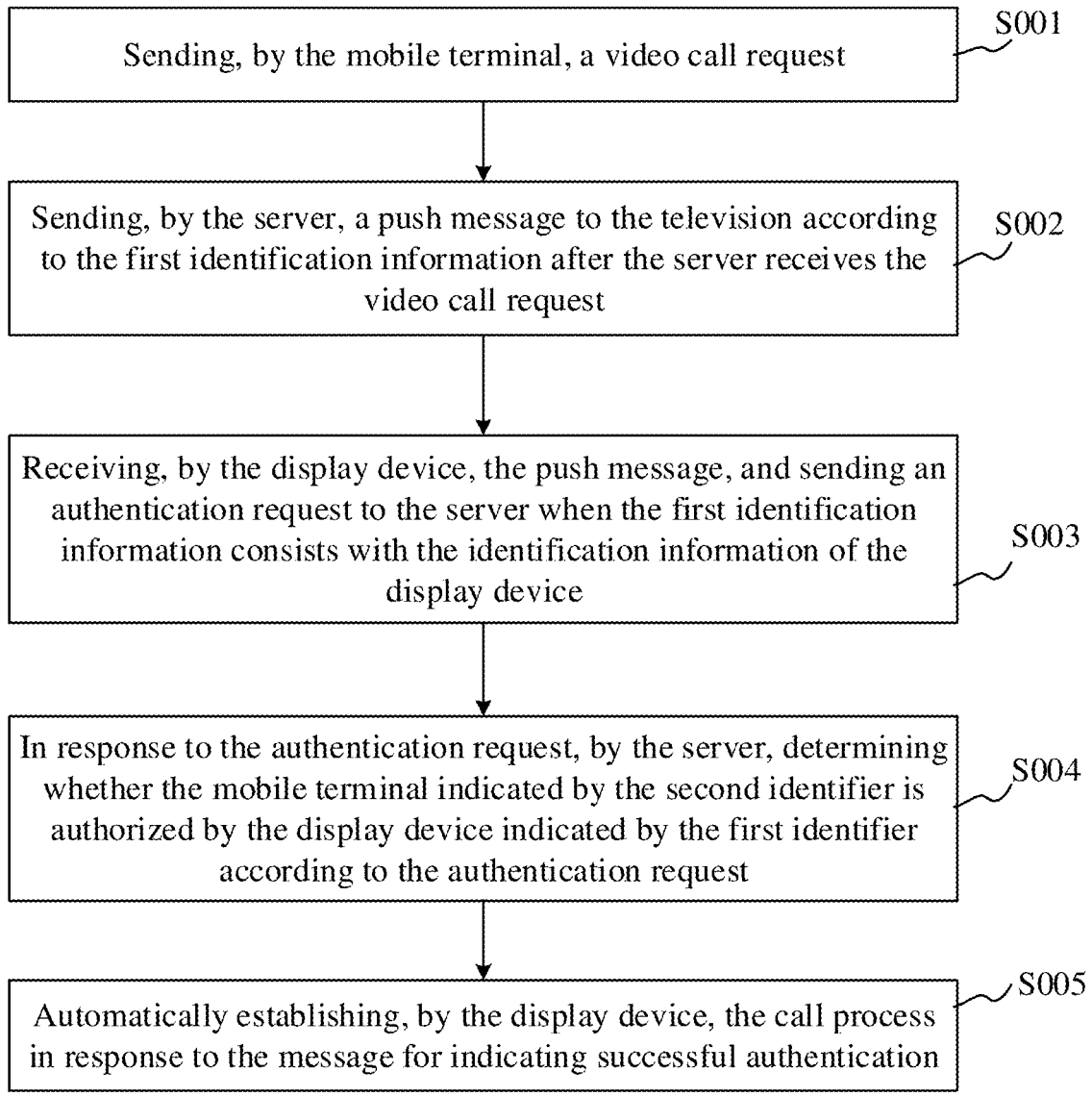
Figure 10B:
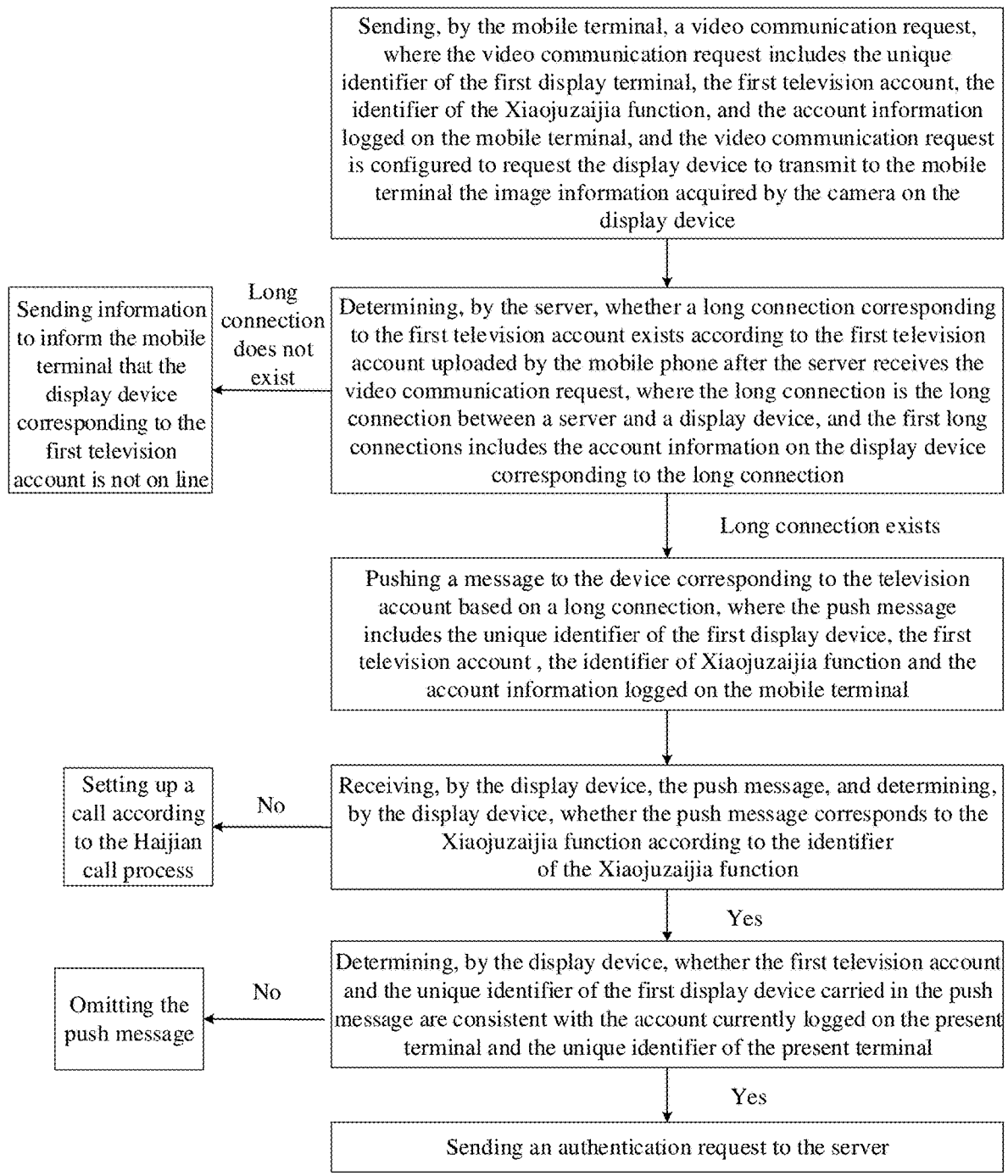
Figure 10C:
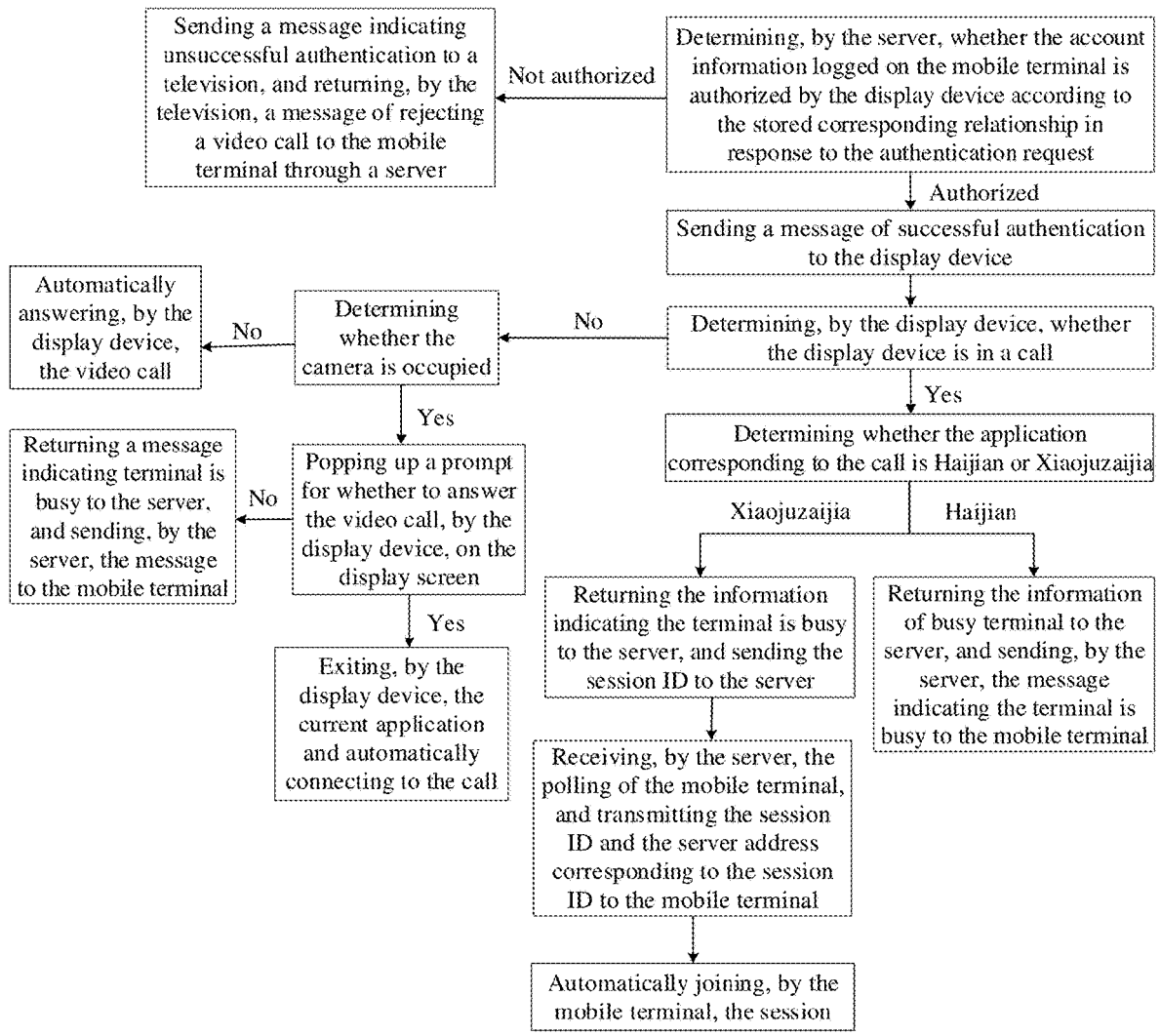

As shown in FIG. 10A, the process of video call includes the following steps.

S001, sending, by the mobile terminal, a video call request.

In some embodiments, the video call request includes the first identification information and the second identification information, and the video call request is configured to request the display device to transmit to the mobile terminal the image information acquired by the camera on the display device. Where the first identification information is the identification information of the invited display device in the video call, and the second identification information is the identification information of the mobile terminal initiating the video call.

In some embodiments, in the authorization process, a mapping relationship between the first identification information and the second identification information is established, and the server stores in advance the mapping relationship.

In some embodiments, the first identification information can be at least one of the unique identifier (device ID1) of the display device or the first account information (customer ID 1) stored on the mobile terminal; and the second identification information can be the account information currently logged on the mobile terminal (customer ID 2) or the unique device identifier (device ID 2) of the mobile terminal.

The first identification information can be either the ID of the display device and/or the account information of the display device stored on the mobile terminal in the video call authorization process, or the ID of the display device and/or the account information of the display device manually input by the user.

Here the video call request further includes an identifier of the first video application (for example, the identifier of the application Xiaojuzaijia), to allow the display device determine which application needs to be called to establish a video call process.

In some embodiments, the display device is a television, and the mobile terminal is a mobile phone or a tablet computer.

In some embodiments, the mobile terminal sends a video call request to the server, and the server informs the display device of the video call request. The display device and the mobile terminal are in different networks, that is, they are not in the same local area network. For example, the television is in a home network, and the mobile phone is in a data network or in another local area network.

S002: sending, by the server, a push message to the television according to the first identification information after the server receives the video call request.

In some embodiments, the push message includes the first identification information and/or the second identification message, and the push message is configured to trigger the display device to verify the validity of the mobile terminal.

In some embodiments, verifying the validity of the mobile terminal refers to determining whether the display device authorizes the mobile terminal to directly establish a video call.

The push message is configured to notify the display device the video call request and trigger the display device to determine the validity of the mobile terminal.

In some embodiments, the push message includes the second identification information, to allow the display device trigger the validity determination.

In some embodiments, the push message further includes the first identification information, to allow the display device determine whether its own identifier is consistent with the first identification information, and triggers the validity determination.

In some embodiments, the push message includes the first identification information and the second identification information, to allow the display device determine whether its own identifier is consistent with the first identification information, and meanwhile trigger the validity determination.

In some embodiments, the push message can be sent to a television according to the first identification information (that is, the account information on the television and/or the unique identifier of the display device). The push message at least includes one of the unique identifier (device ID 1) of the display device, the account information (customer ID 1) on the television, and the account information (customer ID 2) on the mobile terminal.

In some embodiments, the push message can further include an identifier of the first application, and the identifier of the first application is configured to enable the display device to determine which application is needed to launch to establish the call process.

In some embodiments, the first identification information includes first account information (that is, the account information at the television side). A long connection is established between the running display device and the system side, which is established according to the account logged on the display device. The server determines whether a long connection corresponding to the television account information (customer ID 1) exists according to the account information (customer ID 1) on the television uploaded by the mobile phone, if such a long connection exists, then the flow proceeds to next step; if there is no such a long connection, then the server returns "not on line" message to the mobile terminal. The server sends a message to the device corresponding to the account of the television through the long connection, and the push message includes at least one of the above parameters (the first identification information and the second identification information).

Correspondingly, if the display device is in a running state, a long connection exists between the display device (for example, display device A) and the server. The server determines the corresponding display device (for example, display device A) according to the account information (customer ID 1) on the television uploaded by the mobile phone and sends the push message to the display (for example, display device A). If the display device (for example, display device A) is in a power-off or standby mode, no long connection exists between the display device and the server, and the server cannot query the long connection corresponding to the account information (customer ID 1) of the television uploaded by the mobile phone, therefore, the server feeds the information that the display device is not on line back to the mobile terminal, to indicate that the display device corresponding to the account information (customer ID 1) of the television is not on line.

In some embodiments, the server determines whether the display device is on line according to polling information of the display device. If the display device is on line, then the flow continues, and if the display device is not on line, then the server returns the information that the device is not on line to the mobile terminal.

In some embodiments, the display device automatically establishes a call process in response to the push message.

In some embodiments, the display device automatically sends a confirmation message to the server in response to the push message; the server assigns room address of the video call, and the display device receives the call room address sent from the server in response to the confirmation message, and starts the video call according to the call room address.

In some embodiments, after receiving the video call request sent from the mobile terminal, the server determines whether the mobile terminal involved in the call request is authorized by the requested display device according to the prestored authorization mapping relationship. After the server confirms the authorization, the server sends the push message and a message for indicating successful authentication to the display device, and the display device automatically sets up a call process. If the server confirms that no authorization is granted, then the server returns a rejection message to the mobile terminal.

In some embodiments, the method further comprises S003: receiving, by the display device, a push message, and sending an authentication request to the server when the first identification information consists with the identification information of the display device.

In some embodiments, the display device determines the validity of the mobile terminal in response to the push message.

Here said determining the validity of the mobile terminal includes: determining, by the display device, whether the first identification information consists with the identification information of the display device based on the first identification information; if the first identification information consists with the identification information, then sending, by the display device, an authentication request to the server according to the identification information of the display device (including the unique identifier of the display device and/or the currently logged account) and/or the first identification information.

In some embodiments, the above step further includes: after receiving the push message, determining, by the display device, whether the unique identifier (device ID 1) of the display device in the push message is consistent with the unique identifier (device ID 3) of the present display device, and/or whether the account information (customer ID 1) of the television is consistent with the account information (customer ID 3) logged on the present display device, and whether to send authentication request will be determined according to the result of the above determination. In some embodiments, when the unique identifier is consistent with the account information of the television, the display device sends an authentication request to the server. In some embodiments, the authentication request includes the unique identifier (device ID 3) of the display device and/or the currently logged account information (customer ID 3) and/or the first identification information. Since the unique identifier (device ID 1) of the display device in the push message is consistent with the unique identifier (device ID3) of the present display device and/or the account information (customer ID 1) of the television is consistent with the account information (customer ID 3) logged on the present display device, the authentication request can also include the unique identifier (device ID 1) of the display device in the push message or the account information (customer ID 1) of the television.

In some embodiments, the display device includes a call function in the application Xiaojuzaijia and a call function in the application Haijian. The above flow further includes: receiving, by the display device, the push message; determining, by the display device, whether the push message corresponds to the application Xiaojuzaijia according to the identifier of the application Xiaojuzaijia; if the push message corresponds to the application Xiaojuzaijia, then determining, by the display device, whether the account information on the television and the television ID carried in the push message are consistent with the currently logged account information and the device ID of the present device; if the push message does not correspond to the application Xiaojuzaijia, then a call based on the call process for the application Haijian will be established. In a call based on the application Haijian, a call connection is established after a user' acceptance operation on the display device. While the application Xiaojuzaijia does not need an operation of the user during the establish process of a call connection. Here, Xiaojuzaijia (application A) and Haijian (application B) are two functions in an application software package.

The above method further includes: after the display device determines whether the television account information and the television ID carried in the push message are consistent with the currently logged account information and the device ID of the present display device, if not consistent, the push message will be omitted; and if consistent, an authentication request will be sent to the server.

In some embodiments, the authentication request includes ID of the display device and/or the currently logged account information of the display device. The authentication request can further include the device ID of the mobile terminal and its account information. The server performs authentication according to the above information and a preset mapping relationship for authorization.

In some embodiments, the method further comprises step S004: in response to the authentication request, by the server, determining whether the mobile terminal indicated by the second identifier is authorized by the display device indicated by the first identifier according to the authentication request.

In some embodiments, if it is determined that the mobile terminal is authorized by the display device, the server will send authentication success message to the display device.

In some embodiments, if it is determined that the mobile terminal is not authorized by the display device, the server will send a message for indicating unsuccessful authentication to a display device (television). The display device returns a message for indicating that the mobile terminal does not get authentication to the mobile terminal via a server, and the mobile terminal presents prompt information for unsuccessful authentication in the form of voice or text on the interface.

If authentication is successful, the authentication success message will be sent to the display device.

In some embodiments, the authentication request includes the identification information of the display device and/or the first identification information, and the server determines that the mobile terminal indicated by the second identifier is authorized by the display device indicated by the first identifier according to a prestored authorization relationship.

In some embodiments, the display device determines whether it is in a call. If it is in a call, then the display device determines whether the current call is from the application Xiaojuzaijia or from the application Haijian, if it is from the application Haijian, the display device feeds back a message indicating that the device is busy to the mobile terminal via a server. If the current call is from the application Xiaojuzaijia, then the session ID is sent to a server, the server will send the session ID to a mobile terminal, such that the mobile terminal automatically joins the session corresponding to the session ID. Exemplarily, in a corresponding scenario where a second mobile terminal has established a call with the display device using the application Xiaojuzaijia, a first mobile terminal initiates a call request to the same display device. Since the first mobile terminal is authorized by the television, the first mobile terminal can directly join the call between the on-line second mobile terminal and the display device. Accordingly, the number of windows in the second mobile terminal changes from two (a window for television and a local window for the second mobile terminal) to three (the window for television, the local window for the second mobile terminal and the window for the first mobile terminal). The first mobile terminal directly shows three windows (a window for television, a local window for the first mobile terminal and the window for the second mobile terminal). The windows on the television changes from one window (a window for the second mobile terminal) to two windows (a window for the first mobile terminal and a window for the second mobile terminal).

In some embodiments, the authentication operation can be performed before the server sends a call request to a display device (television). After the server receives the first request from the mobile terminal, the server determines whether the display device indicated by the first identification information authorizes the mobile terminal indicated by the second identification information to directly establish a call according to the prestored mapping information. After successful authentication, a push message will be sent to the display device. After the display device receives the push message, the display device again determines whether the first identification information consists with the identification information of the display device according to the first identification information. If yes, a call thread will be created. If not, the push message will be abandoned. Through the authentication at the server side and the further determination at television side according to the first identification information, accuracy in directly establishing a call is increased and possibility of misoperation can be reduced.

In some embodiments, the method further comprises S005: automatically establishing, by the display device, the call process in response to the message for indicating successful authentication.

In some embodiments, the display device asks the server to send a message for rejecting the call to the mobile terminal in response to the message of authentication failure.

In some embodiments, after the display device receives a message of the authentication success, the display device automatically establishes a call process to realize a call with the mobile terminal, thereby avoiding inconvenience during calling, like requiring a user to do some operations to answer a call.

In some embodiments, after receiving the message of authentication success, the display device automatically returns affirmation message to automatically establish a call process; the server assigns call room addresses for the present call process, and respectively sends the call room addresses to the mobile terminal and the display device, such that the display device and the mobile terminal establish a video call according to the call room addresses.

Figure 8A:
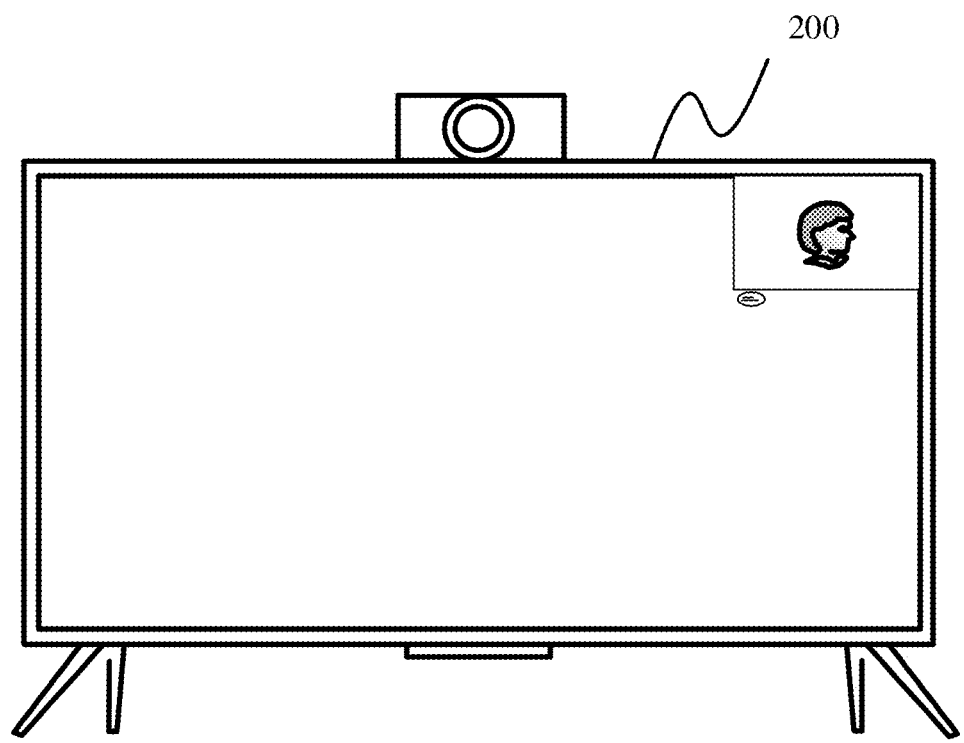
Figure 8B:
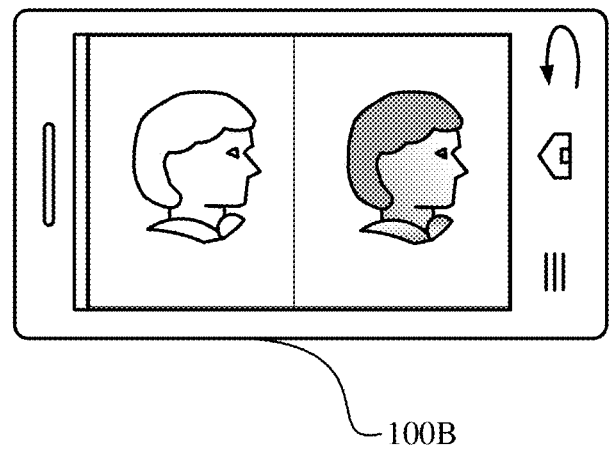

In some embodiments, the establishing of a call process includes establishing a link for the video call and the establishing a floating window showing image data from the mobile terminal on a floating layer of the screen of the display device in the form of a small window, without creating a window for the local video of the display device, as shown in FIG. 8A. Here, the form of a small window refers to a non-full screen display window, the area occupied by the floating window is smaller than the entire area of the display interface of the screen, and the floating window is set to be incapable of acquiring focus. In some embodiments, the small window is created on the OSD floating layer. Meanwhile, in response to the establishment of a video process, the mobile terminal shows a window for local video on the mobile terminal and a window for the video on the display device on the interface of the mobile terminal, as shown in FIG. 8B.

Figure 8C:
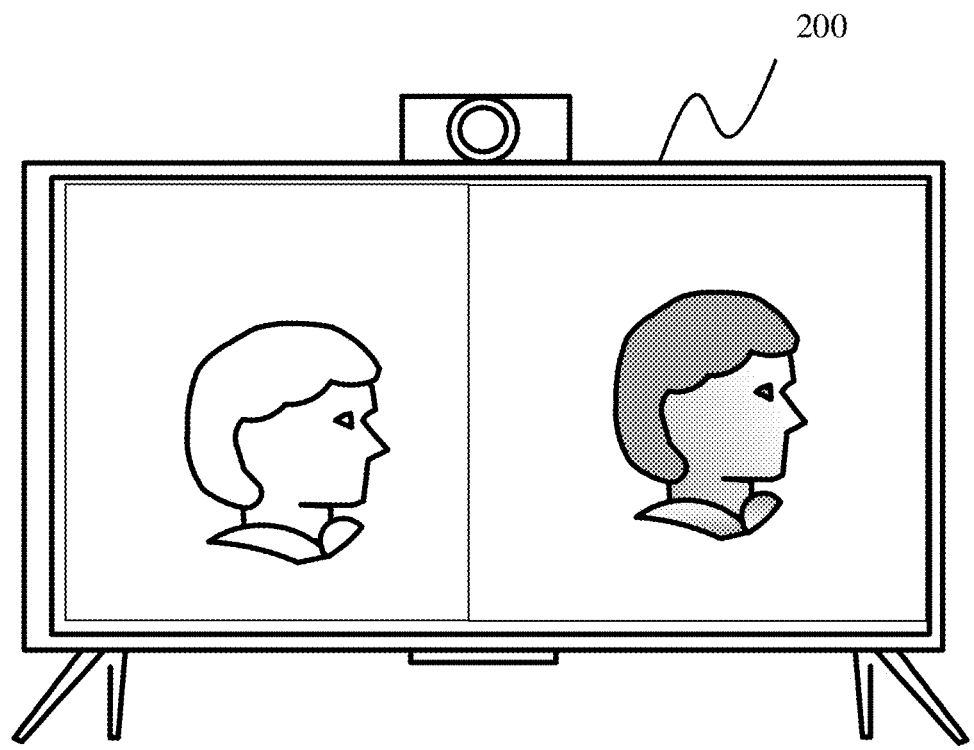

In some embodiments, the display device provides a switch interface (for example, the user operates on the "setting" key through the remote control for switching), and switches the small window to a full-screen window. The switching interface can be either a control on the display interface, or a key value of a certain key of the remote control. The floating small window is switched to be a full-screen window, at this time, the floating window mode is cancelled, and a thread for the local video window on the display device is created. The window for local video and the window for image data from the mobile terminal are shown in a full-screen mode. The full-screen mode is a display mode in which the image layer where the window for showing the local images and the window for showing image data from the mobile terminal covers the whole display screen of the display device. Local images refer to images acquired by the instant device through a camera. The interface of the display device simultaneously displays the window for local video at the display device and the window for video from the mobile terminal, as shown in FIG. 8C.

In some embodiments, the local window and the newly established first window (window for the counterpart) in the full-screen mode are two windows established on the video layer, and respectively shows image data acquired from the local camera and the image data sent from the counterpart device (mobile terminal). Meanwhile, two windows can both acquire focus, such that the user can control volumes or images respectively.

In some embodiments, when the display shows the local window and the first window on the video layer, the display device receives the operation for switching to a small window from the user. In response to the operation for switching to a small window from the user, the display cancels the local window and the first window presented on the video layer, and creates a second window and a third window on the floating layer, wherein the second window is used for playing the video data collected from the camera, and the third window is used for playing the video data sent from the mobile terminal.

Figure 9A:
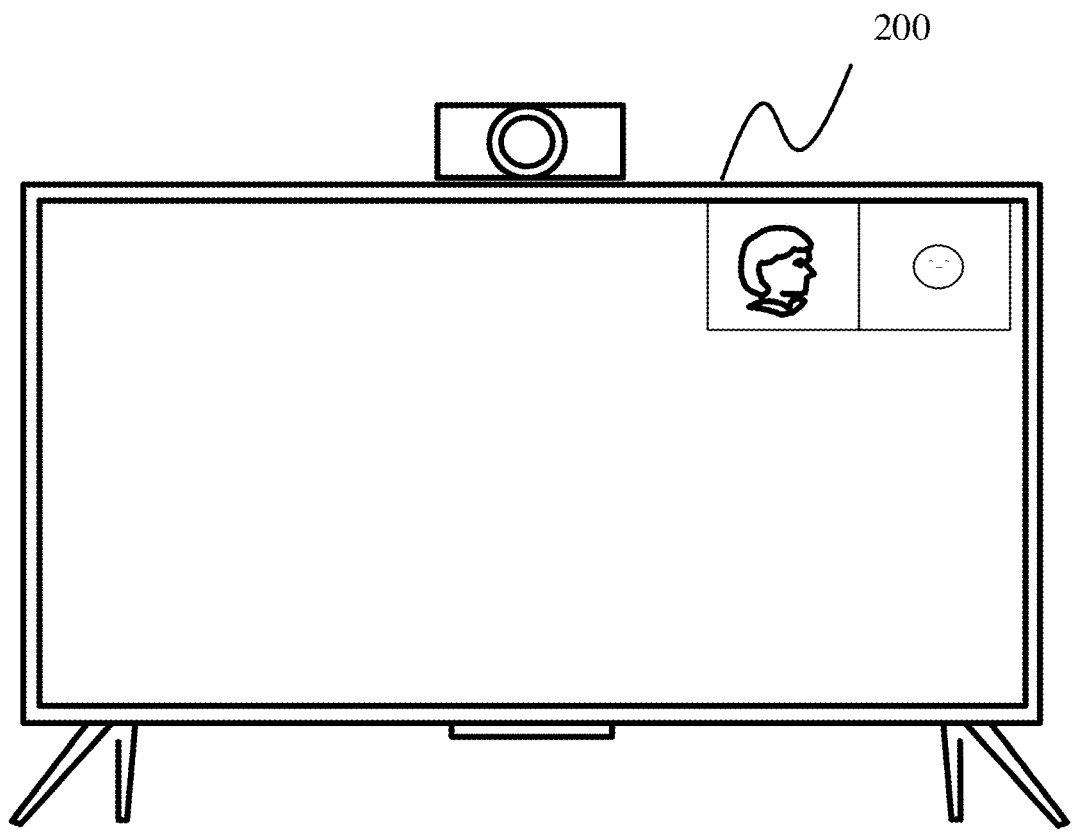
Figure 9B:
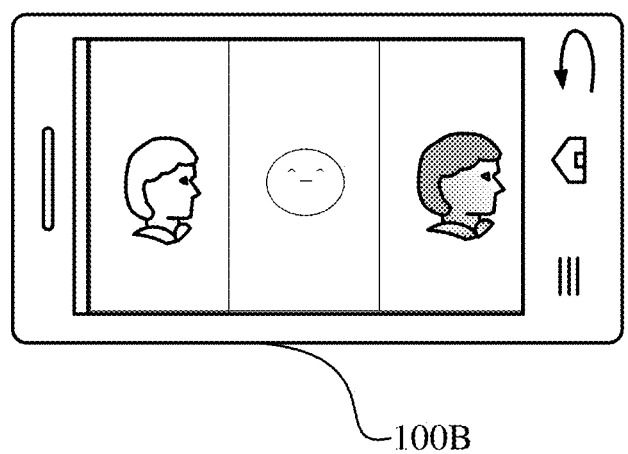

In some embodiments, the display device provides video call functions in two applications, for example, the video call based on Xiaojuzaijia (the first function module or the first application) and the video call based on Haijian (the second function module or the second application). In some embodiments, the display device determines whether the display device is in a call state, for example, the display device determines whether it is in a calling state by determining whether a video call link exists. If there is a video call link, the display device determines whether the application corresponding to the call is Haijian or Xiaojuzaijia. If the call is based on the application Haijian, the display device returns information for indicating the display device is busy to the server, and the server forwards the information to the mobile terminal. If the call is based on the application Xiaojuzaijia, which means that a video call link has already existed, the display device returns information for indicating the display device is busy to the server, and sends a session ID to the server. The server receives polling transmission information (session ID and address of current call room (address of server corresponding to the session ID)) and sends them to the mobile terminal, and the mobile terminal automatically answers and joins the session. In response to the joining of the mobile terminal, the display device adds a call window corresponding to the mobile terminal in the call interface, as shown in FIG. 9A. At this time, the windows in the session of the mobile terminal are all shown on the interface of the mobile terminal, including the local preview window of the mobile terminal, the video window of the display device, and the video window of another party in the existing call, as shown in FIG. 9B.

In some embodiments, in response to determining that the display device is not in a video calling state, the display device determines whether the camera is occupied by other applications. In response to determining that the camera is occupied, the display device pops up a prompt for whether to answer the video call on the display screen. If the video call request is declined, the display device returns information for indicating the display device is busy to the server, then the server sends the busy information to the mobile terminal. If the video call request is answered, the display device exits from the application which occupies the camera, for example, the chess card application (by stopping the process), and automatically connects the call. In this case, the video from the mobile terminal is shown in a small window. If the camera is not occupied by other applications, then the display device automatically creates a call process, establishes a video link, and establishes, in a small window, a video call interface presenting the mobile terminal on the display device.

In some embodiments, the display device receives the push message sent from the server, here the push message is sent after the server receives the video call request sent from the mobile terminal. When the mobile terminal is authorized by the display device, the display device automatically sets up a call process in response to the push message. When the mobile terminal is not authorized by the display device, the display device rejects the video call in response to the push message.

Further, receiving the push message sent from the server includes: receiving, by the display device, the push message and authentication success message sent from the server, here the push message and the authentication success message are sent from the server in response to receiving video call request initiated by the mobile terminal, and the authentication success message indicates that the server determines that the mobile terminal is authorized by the display device.

Further, when the mobile terminal is authorized by the display device, the automatically establishing a call process in response to the push message includes: determining, by the display device, that the mobile terminal is authorized by the display device according to the authentication success message; and automatically establishing, by the display device, a call process to realize transmission of audio and video data between the display device and the mobile terminal.

Further, the automatically establishing a call process includes: automatically sending, by the display device, confirmation message to the server; receiving, by the display device, a call room address sent from the server in response to the confirmation message; and starting, by the display device, the video call according to the call room address.

Further, the push message includes a first identifier, the video call request includes the first identifier and a second identifier. The first identifier is used for indicating the invited display device in the video call, and the second identifier is used for indicating the mobile terminal initiating the video call. The receiving the push message and authentication success message sent from the server includes: receiving, by the display device, the push message sent from the server; sending, by the display device, an authentication request to the server in response to the first identifier in the push message being the same as the identifier of the display device; and receiving, by the display device, the authentication success message sent from the server, where the authentication success message is sent from the server in response to the authentication request when the server determines that the mobile terminal indicated by the second identifier is authorized by the display device indicated by the first identifier according to a prestored authorization mapping relationship.

Further, the automatically establishing a call process includes: determining, by the display device, whether the camera is being occupied. If it is determined that the camera is being occupied, which application is occupying the camera will be further determined; when the display device determines that the application currently occupying the camera is an application in a video call, the display device will cause the server to send the address of the current call room to the mobile terminal, such that the mobile terminal directly joins the current call according to the call room address; when the display device determines that the application currently occupying the camera is another the display device causes the server to forward a message for indicating the camera of the display device is being occupied, to the mobile terminal. If the camera is not being occupied, the display device will automatically establish a call process.

In some embodiments, the display device receives the push message sent from the server, wherein the push message is sent after the server receives the video call request from the mobile terminal. When the mobile terminal is authorized by the display device, the display device automatically established a call process, and controls the display device to display the window of the counterpart and not display the local window in response to the push message. Here the window of the counterpart refers to a window for showing the image data from the mobile terminal, and the local window refers to a window for showing the image data collected by the camera. When the mobile terminal is not authorized by the display device, the display device rejects the video call in response to the push message.

Further, the receiving the push message sent from the server includes: receiving, by the display device, the push message and authentication success message sent from the server, where the push message and the authentication success message are sent from the server in response to the video call request initiated by the mobile terminal, and the authentication success message indicates that the server determines that the mobile terminal is authorized by the display device.

Further, when the mobile terminal is authorized by the display device, the automatically establishing a call process, and controlling to display the window of the counterpart and not to display the local window on the display in response to the push message includes: determining, by the display device, that the mobile terminal is authorized by the display device according to the authentication success message; automatically establishing, by the display device, a call process to realize the transmission of audio and video data between the display device and the mobile terminal, and creating a window for the counterpart not creating a local window on the display interface.

In some embodiments, the window for the counterpart includes a floating window created on the floating layer of the display interface, and the area of the floating window is smaller than the entire display area of the display screen.

In some embodiments, the display device receives a switch instruction operation input from the user; cancels the floating window on display in response to the switch instruction input from the user, and establishes a local video window and a first window on the video layer, where the first window is used for the counterpart.

In some embodiments, the server sends the push message to the display device according to the received video call request sent from the mobile terminal, such that when the mobile terminal is authorized by the display device, in response to the push message, the display device automatically establishes a call process; when the mobile terminal is not authorized by the display device, in response to the push message, the display device rejects the video call.

Further, the sending, by the server, the push message to the display device according to the received video call request sent from the mobile terminal includes: receiving the video call request sent from the mobile terminal, where the first call request includes a first identifier and a second identifier, the first identifier is configured to indicate the invited display device in the video call, and the second identifier is configured to indicate the mobile terminal initiating the video call; and sending the push message and authentication success message to the display device according to the second identifier, where the authentication success message is determined according to the first identifier and the second identifier and the prestored authorization relationship, and the authentication success message indicates that the mobile terminal is authorized by the display device.

Further, the server receives confirmation message returned automatically from the display device, and sends the call room addresses to the mobile terminal and the display device respectively. As such, the display device automatically establishes a video call with the mobile terminal.

Further, the sending, by the server, the push message and authentication success message to the display device according to the second identifier includes: enquiring, by the server, whether an authorization relationship exists between the first identifier and the second identifier in the prestored authorization relationship according to the first identifier and the second identifier. If such authorization relationship exists, the push message and the authentication success message will be sent to the display device. If there is no such authorization relationship, the video call request will be rejected.

Further, the sending the push message and authentication success message to the display device according to the second identifier includes: sending, by the server, the push message to the display device according to the first identifier, where the push message includes the first identifier and the second identifier; receiving, by the server, the authentication request sent from the display device, where the authentication request includes the first identifier, and the authentication request is sent from the display device when the first identifier is the same as the identifier of the display device; enquiring, by the server, whether an authorization relationship exists between the first identifier and the second identifier in the prestored authorization relationship according to the first identifier and the second identifier; if authorization relationship exists, sending the authentication success message to the display device; if not, sending the message of authentication failure to the display device.

Figure 11:
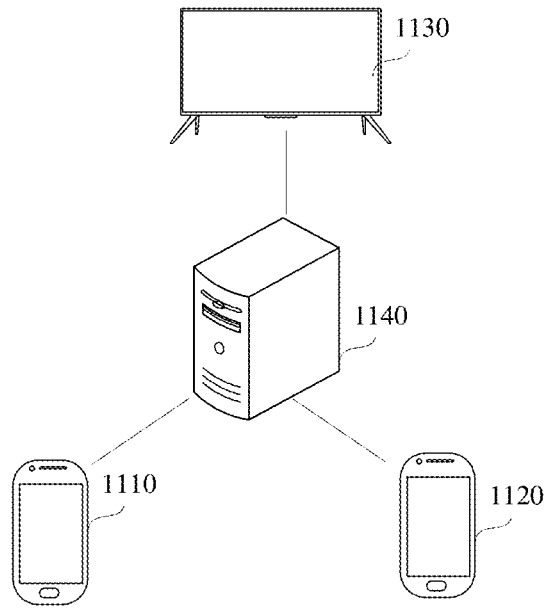
FIG. 11 is a structural schematic diagram of a video calling system shown in part of the exemplary embodiments.

Referring to FIG. 11, FIG. 11 shows a structural schematic diagram of a video calling system according to an embodiment of the present disclosure. The video calling system includes a first mobile terminal 1110, a second mobile terminal 1120, a smart television 1130 and a server 1140. The first mobile terminal 1110 is connected with the server 1140 through a wired network or a wireless network, the second mobile terminal 1120 is connected with the server 1140 through a wired network or a wireless network, and the smart television 1130 is connected with the server 1140 through a wired network or a wireless network.

The first mobile terminal 1110 is a device with a video call function, such as a smart phone.

The second mobile terminal 1120 is a device provided with a video call function, such as a smart phone.

The server 1140 is a back-end server, and can be a server cluster or a cloud computing center comprising one or more servers.

In the embodiments of the present disclosure, during a first video call between the first mobile terminal 1110 and the smart television 1130 via a server 1140, the second mobile terminal 1120 requests to make a second video call with the smart television 1130, so as to join the first video call. Here the number of the first mobile terminal 1110 and the number of the second mobile terminal 1120 are both at least one, and in FIG. 11, only one first mobile terminal 1110 and one second mobile terminal 1120 which are shown for illustration.

Figure 12:
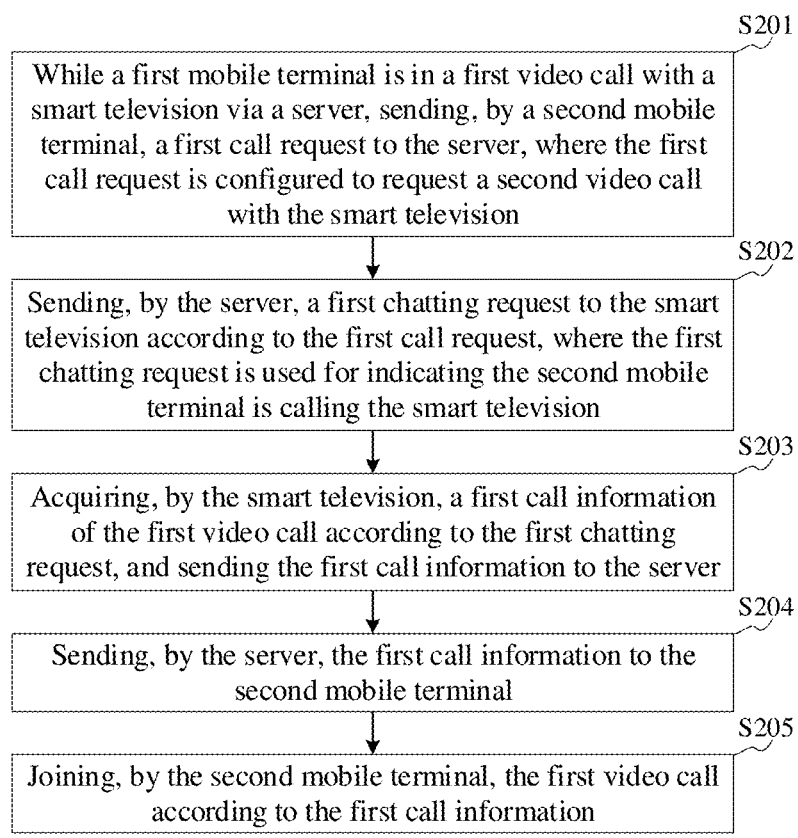
FIG. 12 is a flow chart of a method of performing video call according to an embodiment of the present disclosure.

Referring to FIG. 12, FIG. 12 shows a flow chart of a method of video calling according to an embodiment of the present disclosure, and the method of video call can be applied to the video calling system as shown in FIG. 11. The method of video call includes the following steps.

Step S201, while a first mobile terminal is in a first video call with a smart television via a server, sending, by a second mobile terminal, a first call request to the server, where the first call request is configured to request a second video call with the smart television.

Step S202, sending, by the server, a first chatting request to the smart television according to the first call request, where the first chatting request is used for indicating the second mobile terminal is calling the smart television.

Step S203, acquiring, by the smart television, a first call information of the first video call according to the first chatting request, and sending the first call information to the server, where the first call information is the information for identifying the first video call.

Step S204, sending, by the server, the first call information to the second mobile terminal.

Step S205, joining, by the second mobile terminal, the first video call according to the first call information.

Here step 201 and step 205 can be separately implemented as an embodiment at the second mobile terminal, step 202 and step 204 can be separately implemented as an embodiment at the server, and step 203 can be separately implemented as an embodiment at the smart television.

In summary, in the video call method according to the embodiments of the present disclosure, during a first video call between the first mobile terminal and the smart television via a server, if the second mobile terminal needs to initiate a second video call with the smart television, then the server will send a first chatting request to the smart television, the smart television will send the first call information of the first video call to the server, and the server then sends the first call information to the second mobile terminal, so as to instruct the second mobile terminal to join the first video call. In this way, even if the second mobile terminal is not invited by the first mobile terminal, the second mobile terminal can also join the first video call.

Figure 13:
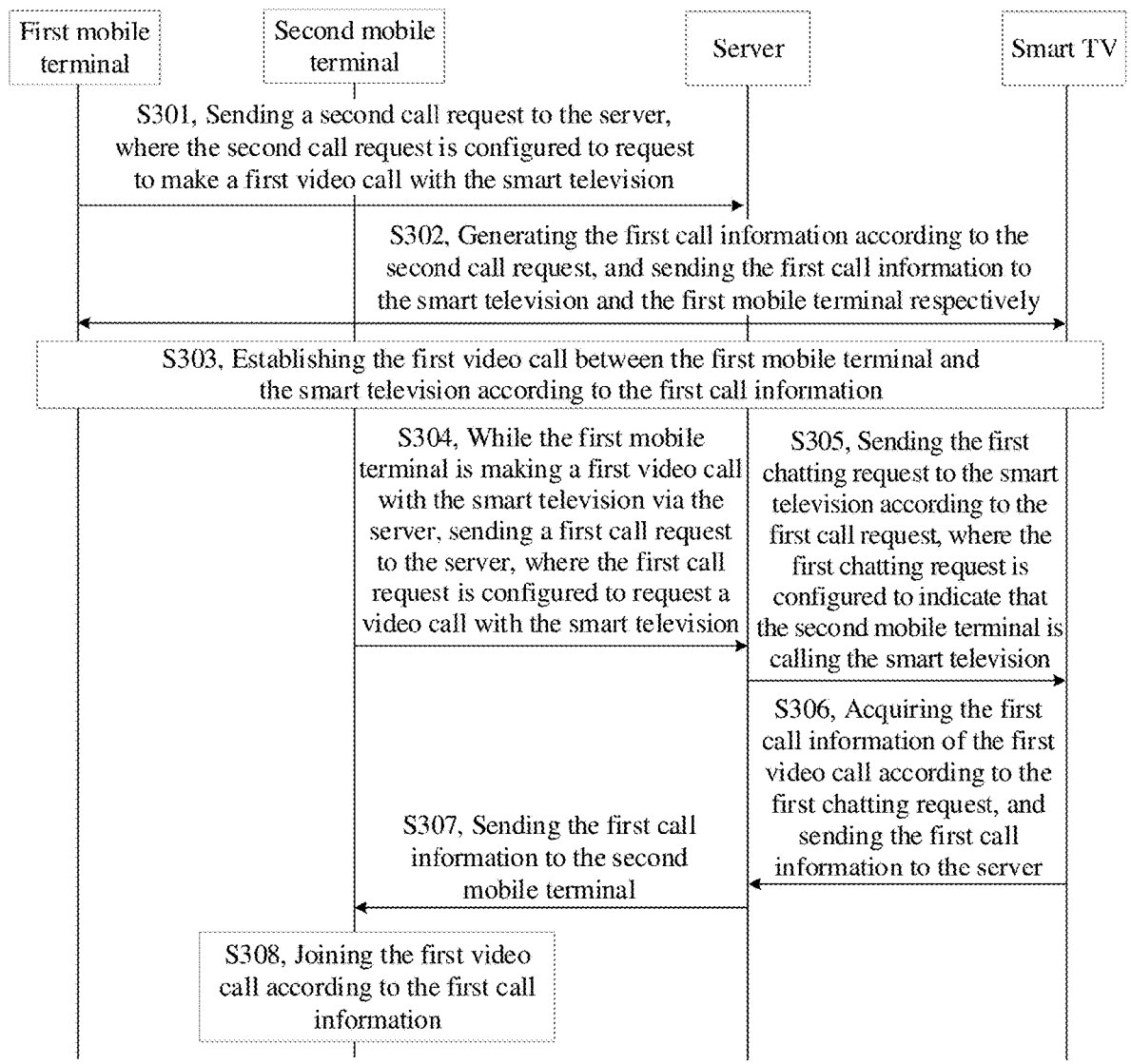
FIG. 13 is a flow chart of a method of performing video call according to another embodiment of the present disclosure.

Referring to FIG. 13, FIG. 13 shows a flow chart of a video call method according to another embodiment of the present disclosure, and the video call method 1 can be applied to the video calling system as shown in FIG. 11. The method of video call includes the following steps.

Step S301, sending, by the first mobile terminal, a second call request to the server, where the second call request is configured to request to make a first video call with the smart television.

The server in the present embodiment can include an authentication network element, a load balancing network element, a service network element and a message platform. Where the authentication network element is configured to determine whether the mobile terminal is authorized by the smart television. The load balancing network element is configured to assign service network elements for the video call based on a load balancing principle. Alternatively, the load balancing network element can be a CSR (Call Signaling Router). The service network element is configured to provide a video call service. Alternatively, the service network element can be a CSE (Call Signaling Engine). The message platform is configured to determine whether the smart television is on line. The interaction between the above network elements is described below.

In the present embodiment, the first mobile terminal can acquire its own second terminal identifier, the number of the first mobile terminal and the television identifier of the smart television to do the video call first, generate a second call request carrying the second terminal identifier, number of the first mobile terminal and the television identifier, and send the second call request to the load balancing network element.

Here the second terminal identifier can include a device identifier (for example, device ID) and a user identifier (for example, customer ID) of the first mobile terminal. In different scenarios, the television identifier can include different contents. In a first scenario, the first mobile terminal calls a smart television, the television identifier includes a device identifier (for example, device ID) and user identifier (for example, customer ID) of the smart television. In the second scenario, the first mobile terminal calls based on a user identifier, and the user identifier is bound with at least one smart television, at this time, the television identifier includes the user identifier of the smart device.

In the present embodiment, the authentication network element can preset a mobile terminal which can make a video call with the smart television, even if the mobile terminal is authorized by the smart television. In this way, the mobile terminal can be authenticated before the mobile terminal initiates a video call to the smart television, thereby avoiding harass calls from unauthorized mobile terminals on the smart television, and improving safety of video call.

For each smart television, the authentication network element can acquire the television identifier of the smart television, acquire the terminal identifier of the mobile terminal which is capable of making a video call with the smart television, and establish a corresponding relationship between the television identifier and the terminal identifier.

During authentication, the first mobile terminal sends the second terminal identifier of the first mobile terminal and the television identifier of the smart television to the authentication network element; the authentication network element determines whether the first mobile terminal is authorized by the smart television according to the second terminal identifier and the television identifier; in response to determining that the first mobile terminal is authorized by the smart television, a fourth confirmation information is sent to the first mobile terminal; and the first mobile terminal triggers to perform step 301 according to the fourth confirmation information. If the first mobile terminal is not authorized by the smart television, the first mobile terminal sends feedback information indicating that the first mobile terminal is not authorized by the smart television, and the first mobile terminal ends the video call.

Here when the authentication network element determines whether the first mobile terminal is authorized by the smart television, the corresponding relationship containing the television identifier of the smart television can be acquired first, and then whether the corresponding relationship includes the second terminal identifier is determined. If the corresponding relationship includes the second terminal identifier, it is determined that the first mobile terminal is authorized by the smart television; and if the corresponding relationship does not include the second terminal identifier, it is determined that the first mobile terminal is not authorized by the smart television.

Step S302, generating, by the server, the first call information according to the second call request, and sending the first call information to the smart television and the first mobile terminal respectively, where the first call information is the identifier information of the first video call.

Here the generating, by the server, the first call information according to the second call request can include the following several sub-steps.

Step S3021, assigning, by the load balancing network element, the first service network element for the first mobile terminal according to the second call request, and sending the second call request to the first network element, where the second call request includes a second terminal identifier of the first mobile terminal and a television identifier of the smart television.

Here the load balancing network element can assign a first service network element for the first mobile terminal based on a load balancing principle.

Step S3022, generating, by the first service network element, the second calling request according to the second call request, and sending the second chatting request to the smart television, where the second chatting request includes the first call information, here the first call information includes a second network element identifier of the first service network element; and sending the first call information to the first mobile terminal.

After receiving the second call request, the first service network element can assign the first session identifier of the first video call, and generate the first call information, where the first call information includes the first session identifier and the second network element identifier of the first service network element. Here the first session identifier can be denoted as session1, the second network element identifier can be denoted by URL (Uniform Resource Locator) 1. The first service network element needs to send the first call information to the first mobile terminal and the smart television respectively. The sending flow will be described below.

1. The first service network element sends the first call information to the first mobile terminal.

The first service network element sends the first call information to the load balancing network element; the load balancing network element sends the first call information to the first mobile terminal; and the first mobile terminal sends a second polling request to the first service network element indicated by the second network element identifier.

The first service network element can receive message of successful answer or message of answer failure in the subsequent process, and put the message of successful answer or message of answer failure into the second polling response to the first mobile terminal. Where the message of successful answer is used for indicating that the smart television allows a first video call with the first mobile terminal. The first mobile terminal can be triggered to perform step S303 according to the message of successful answer. The message of answer failure is used for indicating that the smart television does not authorize the video call with the first mobile terminal, or the smart television is not on line, then the first mobile terminal can end the first video call according to the message of answer failure.

2. The first service network element sends first call information to the smart television.

The first service network element can also read the second terminal identifier, the first mobile terminal number and the television identifier from the second call request, and generate the second chatting request, where the second chatting request carries the first call information, the second terminal identifier, the first mobile terminal number and the television identifier.

The first service network element can send the second chatting request to a message platform, and the message platform sends the second chatting request to the smart television, and sends the push results to the first service network element. When the smart television is on line, the message platform can send the results of successful message push to the first service network element. When the smart television is not on line, the message platform can send results of message push failure to the first service network element. The first service network element can end the first video call, and generate a second polling response carrying the message of answer failure and send the second polling response to the first mobile terminal. In this case, the message of answer failure is configured to indicate that the smart television is not on line.

It should be noted that, when the television identifier in the second chatting request includes the device identifier and the user identifier of the smart television, the message platform can directly send the second chatting request to the smart television indicated by the device identifier. When the television identifier in the second calling request includes just the user identifier of the smart television, and does not include the device identifier of the smart device, the message platform can read the device identifier corresponding to the user identifier from the stored corresponding relationship between the device identifier and the user identifier of the smart television, and then send the second chatting request to the smart television indicated by the device identifier.

Step S303, establishing the first video call between the first mobile terminal and the smart television according to the first call information.

Although the first mobile terminal is configured to send the second call request after successful authentication, since the safety of the first mobile terminal is not high, the first mobile terminal may be maliciously altered such that the second call request is sent without authentication or the second call request is sent when the authentication is failed. Therefore, to improve safety of the video call, the smart television can also read the second terminal identifier and the television identifier from the second chatting request, and perform secondary authentication on the first mobile terminal. In this scenario, the method further includes: the smart television sends the second terminal identifier and the television identifier to the authentication network element; the authentication network element determines whether the first mobile terminal is authorized by the smart television according to the second terminal identifier and the television identifier; if it is determined that the first mobile terminal is authorized by the smart television, the first mobile terminal sends third confirmation information to the smart television; the smart television triggers to perform step 303 according to the third confirmation information; if it is determined that the first mobile terminal is not authorized by the smart television, then the first mobile terminal sends unauthorized feedback information to the smart television, the smart television sends to the first service network element feedback information which indicates that the first mobile terminal is authorized, and the first service network element can end the first video call, and generate the second polling response carrying the message of answer failure and send the second polling response to the first mobile terminal. In this case, the message of answer failure is configured to indicate that the smart television does not authorize a video call with the first mobile terminal.

Here how the authentication network element determines whether the first mobile terminal is authorized by the smart television can refer to the descriptions in step 301, and details for that will omit herein.

It should be noted that, before secondary authentication, the smart television can also determine whether the television identifier in the second chatting request is the same as the television identifier of the smart television. If it is determined that the television identifier in the second chatting request is the same as the television identifier of the smart television, secondary authentication is performed. If it is determined that the television identifier in the second chatting request is different from the television identifier of the smart television, the smart television sends feedback information indicating that the first mobile terminal is authorized to the first service network element, and the first service network element can end the first video call, and generate the second polling response carrying the message of answer failure and send the second polling response to the first mobile terminal.

To avoid that the first mobile terminal has cancelled the video call when the smart television accesses the first video call, the method further includes: sending, by the smart television, message of successful answer to the first service network element according to the first call information; generating, by the first service network element, the second polling response carrying the message of successful answer and sending to the first mobile terminal, and receiving the answer confirmation message sent from the first mobile terminal; sending the answer confirmation message to the smart television, and establishing, by the smart television, a first video call with the first mobile terminal according to the first call information, in response to the answer confirmation message.

Here the smart television can join the unique room indicated by the first session identifier, and perform the first video call in the room, and poll the first service network element for heartbeat message, to ensure that the first video call continues.

Here the first mobile terminal can access the unique room indicated by the first session identifier, make the first video call in the room, and poll the first service network element for the heartbeat message, to make sure that the first video call continues.

If the second mobile terminal also wants to make a video call with the smart television while the first mobile terminal is making the first video call with the smart television, the method goes to steps S304-S308.

Step S304, while the first mobile terminal is making a first video call with the smart television via the server, sending, by the second mobile terminal, a first call request to the server, where the first call request is configured to request a video call with the smart television.

In the embodiments, the second mobile terminal can acquire its own first terminal identifier, the second mobile terminal number and the television identifier of the smart television to be called first, generate a first chatting request carrying the first terminal identifier, the second mobile terminal number and the television identifier, and send the first chatting request to the load balancing network element.

Here the first mobile terminal can include the device identifier (for example, device ID) and the user identifier (for example, customer ID) of the second mobile terminal. According to different scenarios, the television identifier can include different contents. In a first scenario, the second mobile terminal calls a smart television, in this case, the television identifier includes the device identifier (for example, device ID) and the user identifier (for example, the customer ID) of the smart television. In a second scenario, the second mobile terminal calls a user identifier, and the user identifier is bound with at least one smart television, in this case, the television identifier includes the user identifier of the smart device.

Similarly, authentication also needs to be performed before the second mobile terminal sends the first chatting request. During authentication, the second mobile terminal sends the first terminal identifier of the second mobile terminal and the television identifier of the smart television to the authentication network element; the authentication network element determines whether the second mobile terminal is authorized by the smart television according to the first terminal identifier and the television identifier; if it is determined that the second mobile terminal is authorized by the smart television, a second confirmation information is sent to the second mobile terminal; and the second mobile terminal are triggered to perform step 304 according to the second confirmation information. If it is determined that the second mobile terminal is not authorized by the smart television, the feedback information indicating that the second mobile terminal is not authorized is sent to the second mobile terminal, and the second mobile terminal ends the video call.

Here how the authentication network element determines whether the second mobile terminal is authorized by the smart television can refer to the description in step S301, and will omit herein.

Step S305, sending, by the server, the first chatting request to the smart television according to the first call request, where the first chatting request is configured to indicate that the second mobile terminal is calling the smart television.

Here step S305 can include the following sub-steps.

Step S3051, assigning, by the load balancing network element, a second service network element for the second mobile terminal according to the first call request, and sending the first call request to the second service network element, where the first call request includes the first terminal identifier of the second mobile terminal and the television identifier of the smart television.

Here the load balancing network element can assign one second service network element for the second mobile terminal according to a load balancing principle, the second service network element can be the same as the first service network element, and the second service network element can also be different from the first service network element, which is not limited in the embodiments of the present disclosure.

Step S3052, generating, by the second service network element, a first chatting request according to the first call request, and sending the first chatting request to the smart television, where the first chatting request includes the second call information of the second video call. Here the second call information is the identification information of the second video call, and the second call information includes the first network element identifier of the second service network element.

After receiving the first call request, the second service network element can assign a second session identifier of the second video call, and generate the second call information, and the second call information includes the second session identifier and the first network element identifier. Where the second session identifier can be denoted as session2, and the first network element identifier can be denoted by URL2. The second service network element needs to send the second call information to the second mobile terminal and the smart television respectively, and the sending process will be described below.

1. The second service network element sends the second call information to the second mobile terminal.

The second service network element sends the second call information to the load balancing network element; the load balancing network element sends the second call information to the second mobile terminal; and the second mobile terminal sends a first polling request to the second service network indicated by the first network element identifier.

The second service network can receive the message of successful answer or the message of answer failure in the subsequent process, and carry the message of successful answer or message of answer failure in a first polling response and send it to the second mobile terminal. The message of successful answer is the first call information, and is configured to instruct the second mobile terminal to access the first video call, then the second mobile terminal can be triggered to perform step S308 according to the first call information. The message of answer failure is configured to indicate that the smart television does not authorize a video call with the second mobile terminal, or the smart television is not on line, then the second mobile terminal can end the video call according to the message of answer failure.

2. The second service network element sends the second call information to the smart television.

The second service network element can also read the first terminal identifier, the second mobile terminal number and the television identifier from the first call request, and generate the first chatting request, where the first chatting request carries the second call information, the first terminal identifier, the second mobile terminal number and the television identifier.

The second service network element can send the first chatting request to the message platform, and the message platform sends the first chatting request to the smart television, and sends the push results to the second service network element. When the smart television is on line, the message platform can send the pushing results of successful push to the second service network element; when the smart television is not on line, the message platform can send the pushing results of push failure to the second service network element, the second service network element can end the second video call, and generate a first polling response carrying the message of answer failure and send the first polling response to the second mobile terminal. In this case, the message of answer failure is configured to indicate that the smart television is not on line.

It should be noted that, when the television identifier in the first chatting request includes the device identifier and the user identifier of the smart television, the message platform can directly send the first chatting request to the smart television indicated by the device identifier; when the television identifier in the first chatting request includes the user identifier of the smart television and does not include the device identifier of the smart device, the message platform can read the device identifier corresponding to the user identifier from the stored corresponding relationship between the device identifier and the user identifier of the smart television, and then send the first chatting request to the smart television indicated by the device identifier.

Step S306, acquiring, by the smart television, the first call information of the first video call according to the first chatting request, and sending the first call information to the server.

To improve safety of the video call, the smart television may perform secondary authentication on the second mobile terminal. In this scenario, the method further includes: the smart television sends the first terminal identifier and the television identifier to the authentication network element; the authentication network element determines whether the second mobile terminal is authorized by the smart television according to the first terminal identifier and the television identifier. In response to determining that the second mobile terminal is authorized by the smart television, first confirmation information is sent to the smart television; the smart television is triggered to perform step 306 according to the first confirmation information. In response to determining that the second mobile terminal is not authorized by the smart television, the feedback information indicating that the second mobile terminal is not authorized is sent to the smart television. The smart television sends to the second service network element the feedback information, and the second service network element can end the second video call, and generate the first polling response carrying the message of answer failure and send the first polling response to the second mobile terminal. In this case, the message of answer failure is configured to indicate that the smart television does not authorize a video call with the second mobile terminal.

Here the process on how the authentication network element determines whether the second mobile terminal is authorized by the smart television can refer to the description in step S301, and will omit herein.

It should be noted that, before secondary authentication, the smart television can also determine whether the television identifier in the first chatting request is the same as the television identifier of the smart television. In response to determining that the television identifier in the first calling request is the same as the television identifier of the smart television, secondary authentication is performed; in response to determining that the television identifier in the first calling request is different from the television identifier of the smart television, the smart television sends feedback information indicating that the second mobile terminal is not authorized to the second service network element, and the second service network element can end the second video call, and generate the first polling response carrying the message of answer failure and send the first polling response to the second mobile terminal.

If the second mobile terminal is authorized by the smart television, the smart television can acquire the first call information of the first video call according to the first calling request, and send the first call information to the second service network element.

If the second mobile terminal is not authorized by the smart television, the smart television can also send to the second service network element the information for indicating to end the second video call. After the second service network element receives the information for ending the second video call, the second service network element can carry the information in the first polling response and send the first polling response to the second mobile terminal. Upon receiving the feedback information for ending the second video call sent from the second mobile terminal, the second video call is ended; or, the second service network element can start timing when receiving the information, and end the second video call after the timing is timeout.

Step S307, sending, by the server, the first call information to the second mobile terminal.

In the embodiments, the second service network element can send the first call information to the second mobile terminal, where the second service network element can carry the first call information in the first polling response and send the first polling response to the second mobile terminal.

Step S308, joining, by the second mobile terminal, the first video call according to the first call information.

The second mobile terminal can read the first session identifier and the second network element identifier from the first call information, and send a request for joining the session to the first service network element indicated by the second network element identifier, where the request for joining the session carries a first session identifier, the first terminal identifier and the second mobile terminal number.

The second mobile terminal can join the unique room indicated by the first session identifier, make the first video call in the room, and poll the first service network element for heartbeat message, to ensure that the first video call continues.

The first mobile terminal and the smart television keep the first video call, continue the first video call in the unique room indicated by the first session identifier, and poll the first service network element for the heartbeat message, to ensure that the first video call continues. Alternatively, the first mobile terminal and the smart television can acquire the first mobile terminal identifier of the second mobile terminal and the second mobile terminal number through polling, to indicate the identity of the newly joined member through the first terminal identifier and the second mobile terminal number.

Here step S301 and step S303 can be separately implemented as an embodiment at the first mobile terminal, step S302, step S305 and step S307 can be separately implemented as an embodiment at the server, and step S303 and step S306 can be separately implemented as an embodiment at the smart terminal, and step S304 and step S308 can be separately implemented as an embodiment at the second mobile terminal.

In summary, in the video call method according to the embodiments of the present disclosure, while the first mobile terminal is in a first video call with the smart television through a server, if a second mobile terminal needs to initiate a second video call with the smart television, then the server will send the first chatting request to the smart television, the smart television will send the first call information of the first video call to the server, and the server then sends the first call information to the second mobile terminal, so as to instruct the second mobile terminal to access the first video call. In this way, even if the second mobile terminal is not invited by the first mobile terminal, the second mobile terminal can also join the first video call.

Figure 14:
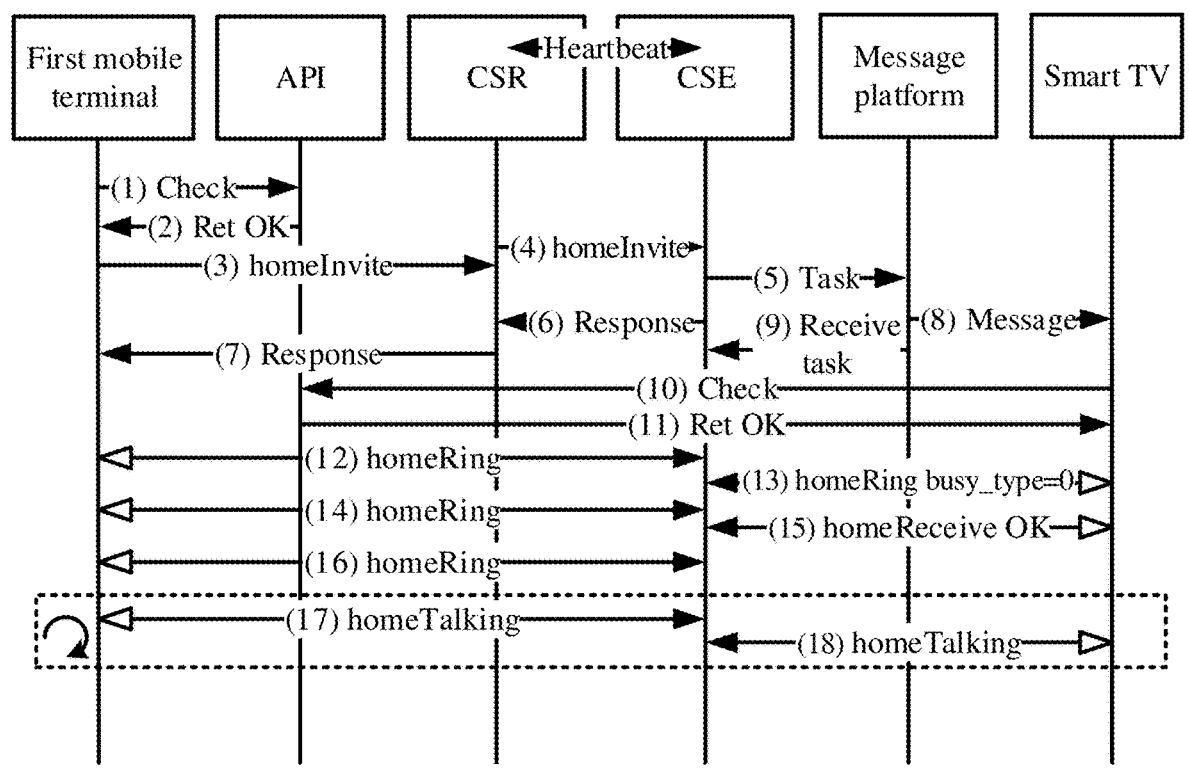
FIG. 14 is a flow chart of a method of performing video call according to an embodiment of the present disclosure.

Here step S301 to step S303 describe a process in which the first mobile terminal and the smart television establish a first video call, and the implementing process is discussed below with reference to FIG. 14. The load balancing network element in the server is a CSR (Call Signaling Router), the service network element is a CSE (Call Signaling Engine), and the server further includes a system API (Application Programming Interface) and a message platform.

(1) Check: the first mobile terminal sends a request to the API, where the request carries a device identifier (device ID) and the customer side identifier (customer ID) of the first mobile terminal, and device ID and customer ID of the smart television.

(2) Ret OK: the API checks whether the device ID of customer ID of the smart television authorizes video call for the device ID of the customer ID of the first mobile terminal. If an authorization is granted, then return ok information. If no authorization is granted, then return unauthorized information. If the information that the ID is not authorized is returned, the call will be ended. If the ok information is returned, the flow goes to step (3).

(3) homeInvite: the first mobile terminal transmits a call request to the CSR for video calling.

(4) homeInvite: the CSR receives the call request, selects a CSE, and forwards the call request to the CSE.

(5) Task: the CSE receives the call request, assigns a unique session id for the call, and sends a push request to the message platform. Where the push request carries the unique session id, the url address of CSE, the customer ID of the smart television, the device ID and customer ID of the first mobile terminal and the calling number.

(6) Response: CSE returns information to the CSR, and the information carries the unique session id and the url address of the service network element CSE.

(7) Response: CSR forwards the information returned from the CSE to a first mobile terminal.

(12) (14) (16) homeRing: the first mobile terminal receives the url address of CSE, then polls the CSE and waits for the smart television to answer.

(8) Message: the message platform sends message to the device ID corresponding to the customer ID of the smart television.

(9) Receive task: the message platform returns the message push result to the CSE, and the message push result includes a result for whether the message push has been pushed to a smart television. If the smart television is not on line, the CSE ends the present call. The first mobile terminal receives a polling response which indicates that the call is ended via the polling in steps (12) (14) (16). The first mobile terminal ends the call.

(10) Check: the smart television sends a request to the API, where the request carries device ID and customer ID of the smart television, and device ID and customer ID of the first mobile terminal.

(11) Ret OK: API checks whether the device ID of customer ID of the first mobile terminal is authorized by the device ID of customer ID of the smart television. If an authorization is granted, ok information for confirmation will be returned. If no authorization is granted, the information for indicating that the first mobile terminal is authorized will be returned.

(13) homeRingbusy_type=0: the smart television acquires the unique session id, the url address of the CSE, the customer ID of the smart television, and the device ID and customer ID and the first mobile terminal number from the push message. If no authorization is granted, the information for indicating that the first mobile terminal is not authorized is sent to the CSE. The first mobile terminal receives a polling response which indicates unauthentication during the polling in steps (12) (14) (16). The first mobile terminal ends the call.

(15) homeReceive OK: if an authorization is granted, then the smart television sends the message of successful answer to the CSE. The first mobile terminal receives a polling response which indicates successful call answering during the polling in steps (12) (14) (16).

(17) homeTalking: after connecting a call, the first mobile terminal joins the unique room indicated by the unique session id, makes the video call in the room, and polls the url address of the CSE for heartbeat message, to ensure that the call process continues.

(18) homeTalking: after connecting the call, the smart television joins the unique room indicated by the unique session id, makes the video call in the room, and polls the url address of the CSE for heartbeat message, to ensure that the call process continues.

Figure 15:
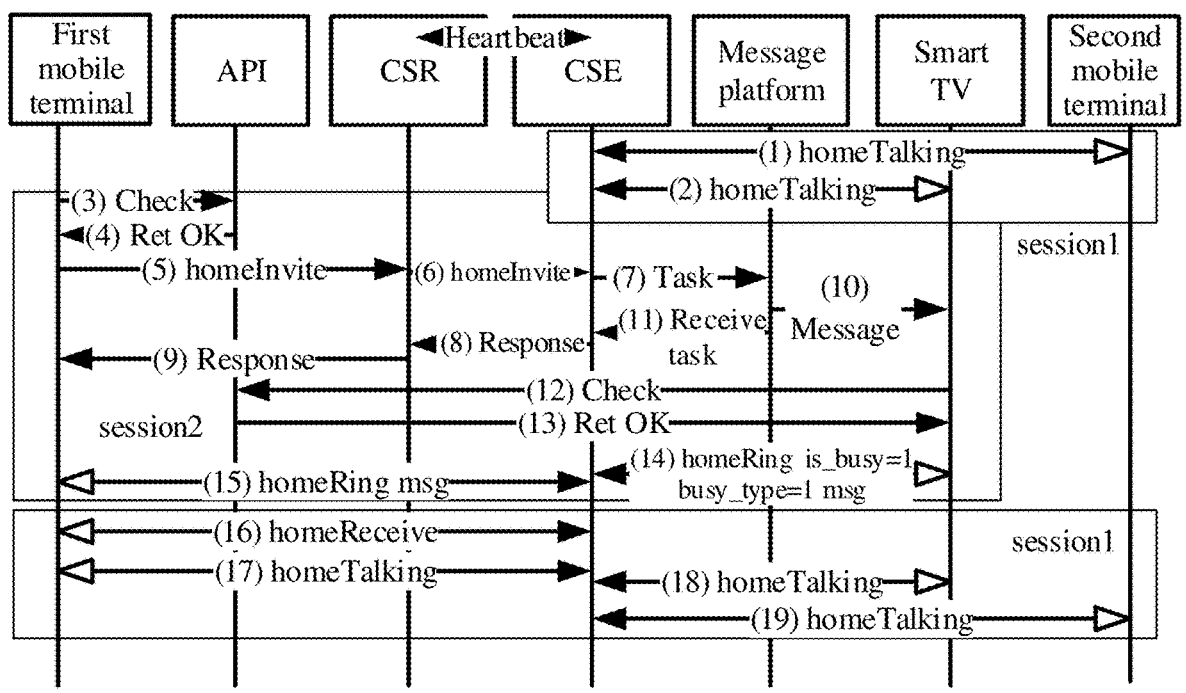
FIG. 15 is a flow chart of a method of performing video call according to another embodiment of the present disclosure.

Here step S307 to step S311 describe a process in which the second mobile terminal joins a first video call, and the implementing process is discussed below with reference to FIG. 15. Here, the load balancing network element in the server is a CSR, the service network element is a CSE, and the server further includes a system API and a message platform.

(1) homeTalking: after connecting a call, the first mobile terminal joins the unique room indicated by the unique session id session1, makes the video call in the room, and polls the url1 address of the CSE for heartbeat message, to ensure that the call process continues.

(2) homeTalking: after connecting a call, the smart television joins the unique room indicated by the unique session id session1, makes the video call in the room, and polls the url1 address of the CSE for heartbeat message, to ensure that the call process continues.

(3) Check: the second mobile terminal sends a request to the API, where the request carries the device ID and customer ID of the first mobile terminal, and device ID and customer ID of the smart television.

(4) Ret OK: the API checks whether the device ID of customer ID of the smart television authorizes the video call for device ID and the customer ID of the second mobile terminal. If an authorization is granted, ok information for confirmation will be returned. If no authorization is granted, the information for indicating that the second mobile terminal is not authorized will be returned. If the information for indicating that the second mobile terminal is not authorized is returned, the call will be ended. If the ok information is returned, the flow goes to step (5).

(5) homeInvite: the second mobile terminal transmits a call request to the CSR for video calling.

(6) homeInvite: the CSR receives the call request, selects a CSE, and forwards the call request to the CSE.

(7) Task: the CSE receives the call request, assigns the call with the unique session id session2, and sends a push request to the message platform. The push request carries the unique session id session2, the url2 address of CSE, the customer ID of the smart television, the device ID and customer ID of the second mobile terminal and the calling number.

(8) Response: CSE returns information to the CSR, and the information carries the unique session id session2 and the url2 address of the CSE.

(9) Response: CSR forwards the information returned from the CSE to the second mobile terminal.

(15) homeRing msg: the second mobile terminal receives the url2 address of CSE, then polls the CSE and waits for the smart television to answer.

(10) Message: the message platform sends message to the device ID corresponding to the customer of the smart television.

(11) Receive task: the message platform returns message push result to the CSE. The message push result includes a result for whether the message has been pushed to the called end. If the smart television is not on line, the CSE ends the present call. The second mobile terminal receives a polling response for call ending from the polling in step (15) (homeRing msg). The second mobile terminal ends the call.

(12) Check: the smart television sends a request to the API, where the request carries device ID and customer ID of the smart television, and device ID and customer ID of the second mobile terminal.

(13) Ret OK: API checks whether the device ID of customer ID of the second mobile terminal is authorized by the device ID of customer ID of the called smart television. If an authorization is granted, ok information for confirmation will be returned. If no authorization is granted, then the information for indicating that the second mobile terminal is not authorized will be returned.

(14) homeRingis_busy=1 busy_type=1 msg: the smart television acquires, from the push message, the unique session id session2, the url2 address of CSE, the customer ID of the smart television, the device ID and customer ID of the second mobile terminal and the calling number. If no authorization is granted, the information for indicating that the second mobile terminal is not authorized is sent to the CSE. The second mobile terminal receives a polling response which indicates unauthorization during the polling in steps (15). The second mobile terminal ends the call. If an authorization is granted, a message of successful answering is sent to the CSE, and the message of successful answering includes the unique session id session1 of the present call and the url1 address of the CSE of the present call. The second mobile terminal receives a polling response which indicates successful call answering from the polling in step (15).

(16) homeReceive: the second mobile terminal acquires the unique session id session1 of the present call and the url1 address of the CSE of the present call from the poling message in step (15), and transmits a request for joining the call to the url1 address of CSE, where the request carries the unique session id session1, the device ID and customer ID of the second mobile terminal and the calling number.

(17) homeTalking: after entering into the call, the second mobile terminal joins the unique room indicated by the unique session id session1, makes a video call in the room, and polls the url1 address of the CSE for heartbeat message, to ensure that the call process continues.

(18) homeTalking: the smart television keeps the call in the unique room indicated by the unique session id session1, and polls the url1 address of the CSE for heartbeat message, to ensure that the call process continues, and newly joined member information can be acquired simultaneously through the polling information.

(19) homeTalking: the first mobile terminal continues to keep the call in the unique room indicated by the unique session id session1, and polls the url1 address of the CSE for heartbeat message, to ensure that the call process continues, and newly joined member information can be acquired simultaneously through the polling information.

Figure 16:
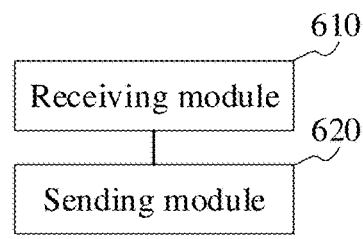
FIG. 16 is a structural block diagram of a device for performing a video call according to an embodiment of the present disclosure.

Please refer to FIG. 16 which shows a structural schematic diagram of a video calling device according to an embodiment of the present disclosure. The video calling device can be applied to the server. The video calling device includes the following modules.

A receiving module 610, is configured to receive a first call request sent from a second mobile terminal while a first mobile terminal is in s a first video call with the smart television via a server, where the first call request is configured to request a second video call with the smart television.

A sending module 620, is configured to send a first chatting request to the smart television according to the first call request, where the first chatting request is configured to indicate that the second mobile terminal is calling the smart television.

The receiving module 610, is further configured to receive the first call information of the first video call sent from the smart television according to the first chatting request.

The sending module 620, is further configured to send the first call information to the second mobile terminal, where the first call information is configured to for indicating allowing the second mobile terminal to join the first video call.

In some embodiments, a display device includes:
a camera;
a display, configured to display a window for a counterpart and/or a local window, where the window for the counterpart is a window configured to show the image data sent from the mobile terminal, and the local window is a window configured to show the image data collected by the camera;
a processor, wherein the processor is configured to:
receive a push message sent from the server, where the push message is sent after the server receives a video call request from a mobile terminal; automatically establish a call process, and cause the display to show the window for the counterpart and not to show the local window in response to the push message when the mobile terminal is authorized by the display device; and reject the video call request in response to the push message when the mobile terminal is not authorized by the display device.

Further, the processor is further configured to:
show the window for the counterpart and not show the local window on the display, and receive a switch operation input from the user; and
cancel the floating window in response to the switch operation from the user, and establish a local video window and a first window on the video layer, where the first window is set to be a window for the counterpart.

Further, the processor is further configured to:
receive an operation for switching to a small window from the user while the display shows the local window and the first window on the video layer; and
in response to the operation for switching to a small window from the user, cancel the local window and the first window display shown on the video layer, and establish a second window and a third window on the floating layer, where the second window is configured for showing the video data collected from the camera, and the third window is configured for showing the video data from the mobile terminal.

In some embodiments, the display device includes a microphone, a loudspeaker, and a camera;
the display is configured to display a window for the counterpart and/or a local window, where the window for the counterpart is a window for showing the image data from the mobile terminal, and the local window is a window configured for showing the image data collected from the camera;
a processor, wherein the processor is configured to:
receive a push message sent from the server, where the push message is sent after the server receives a video call request from the mobile terminal;
when the mobile terminal is authorized by the display device, in response to the push message, control the display to present the window for the counterpart and not to present the local window on the display, control the loudspeaker to output the audio data sent from the mobile terminal, control the camera to collect image data configured for sending to the mobile terminal, and control the microphone to collect the audio data configured for sending to the mobile terminal; and
reject the video call request in response to the push message when the mobile terminal is not authorized by the display device.

In summary, the video calling device according to the embodiments of the present disclosure, while the smart television is in call video call with a first mobile terminal via a server, if the second mobile terminal needs to initiate a second video call with the smart television, then the server will send the first chatting request to the smart television, the smart television will send the first call information of the first video call to the server, and the server then forwards the first call information to the second mobile terminal, so as to enable the second mobile terminal to join the first video call. In this way, even if the second mobile terminal is not invited by the first mobile terminal, the second mobile terminal can also join the first video call.

On the basis of the exemplary embodiments shown in the present disclosure, all of the other embodiments obtained by those skilled in the art without any creative effort shall all fall within the protection scope of the present disclosure. In addition, although the contents disclosed in the present disclosure are introduced in terms of one or more exemplary examples, it should be understood that, each aspect of these disclosed contents can also separately constitute a complete technical solution.

It should be understood that, the terms "first", "second", "third" and the like in the specification, the claims and in the above accompanying drawings in the present disclosure are used for distinguishing similar objects, rather than for defining a particular order or sequence. It should be understood that, the data so used may be interchangeable where appropriate, for example, the data can be implemented in an order other than those given in the diagram or description of the embodiments of the present disclosure.

In addition, the terms "include" and "have" and any deformation thereof intend to cover but not exclusively contain, for example, products or devices containing a series of components are not necessarily limited to those clearly listed components, but can include other components which are not clearly listed or which are inherent to these products or devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display device, comprising:
   a camera;
   a display, configured to present a first window for a counterpart and/or a local window, wherein the first window for the counterpart is a window configured to show video data sent from a mobile terminal, and the local window is a window configured to show video data collected from the camera;
   a processor, wherein the processor is configured to:
   receive a push message sent from a server, wherein the push message is sent after the server receives a video call request for initiating a video call to the display device sent from the mobile terminal as a calling party, wherein the push message comprises a first device ID of the display device;
   obtain a second device ID of the display device locally;
   determine the first device ID carried in the push message is same as the second device ID obtained locally;
   in response to the first device ID being same as the second device ID, determine that the mobile terminal is authorized by the display device;
   determining whether the camera in the display device is being occupied by an application installed in the display device;
   in response to determining that the camera is being occupied, determining which application is currently occupying the camera;
   in response to the application currently occupying the camera being a first application in a first video call currently performing in the display device, causing the server to send a room address for the first video call to the mobile terminal, to allow the mobile terminal to directly join the first call according to the room address;
   in response to the application currently occupying the camera being a second application which does not involve in a video call, causing the server to return to the mobile terminal a message for indicating that the camera of the display device is being occupied; and
   in response to determining that the camera is not being occupied, automatically establish a call process between the display device and the mobile terminal by receiving a session identification information configured for a session between the display device and the mobile terminal from the server, and control the display to present the first window for presenting video data from the counterpart and not to present the local window; and
   in response to the first device ID being not same as the second device ID, determine the mobile terminal is not authorized by the display device, and reject the video call request.

2. The display device according to claim 1, wherein the processor is further configured to:
   receive a switch operation input from a user while the display presents the first window for the counterpart and does not present the local window;
   cancel a floating window in response to the switch operation from the user, and establish a window for a local video and a first window on a video layer, wherein the first window is set to be the first window for the counterpart.

3. The display device according to claim 2, wherein the processor is further configured to:
   receive an operation for switching to a small window input from the user while the display presents the window for the local video and the first window on the video layer; and
   in response to the operation for switching to the small window, cancel the local window and the first window presented on the video layer, and establish a second window and a third window on the floating layer, wherein the second window is configured for showing video data collected from the camera, and the third window is configured for showing video data sent from the mobile terminal.

4. The display device according to claim 1, wherein the display device further comprises a microphone, and the processor is further configured to:
   when the mobile terminal is authorized by the display device, in response to the push message, cause the microphone to collect audio data for sending to the mobile terminal.

5. The display device according to claim 1, wherein the display device further comprises a loudspeaker, and the processor is further configured to:
   when the mobile terminal is authorized by the display device, in response to the push message, cause the loudspeaker to output audio data sent from the mobile terminal.

6. The display device according to claim 1, wherein the processor is further configured to:
   receive a message for indicating successful authorization sent from the server;
   wherein the message for indicating successful authorization is sent from the server in response to receiving the video call request initiated by the mobile terminal, and the message indicates that the server determines that the mobile terminal is authorized by the display device.

7. The display device according to claim 6, wherein the processor is further configured to:
   determine that the mobile terminal is authorized by the display device according to the message for indicating successful authorization; and
   automatically establish a call process to realize transmission of audio and video data between the display device and the mobile terminal.

8. The display device according to claim 1, wherein the processor is further configured to automatically establish the call process by:
   automatically sending a confirmation message to the server;
   receiving a call room address, wherein the call room address is sent from the server in response to the confirmation message; and
   initiating a video call according to the call room address.

9. The display device according to claim 1, wherein the push message comprises a first identifier, the video call request comprises the first identifier and a second identifier, wherein the first identifier is configured to indicate the display device as a called party in the video call, and the second identifier is configured to indicate the mobile terminal as the calling party in the video call.

10. A method of performing a video call, comprising:
    presenting a first window for a counterpart and/or a local window on a display of a display device, wherein the first window for the counterpart is a window configured to show video data sent from a mobile terminal, and the local window is a window configured to show video data collected from a camera in the display device;

receiving a push message sent from a server, wherein the push message is sent after the server receives a video call request for initiating a video call to the display device sent from the mobile terminal as a calling party, wherein the push message comprises a first device ID of the display device;

obtaining a second device ID of the display device locally;

determining the first device ID carried in the push message is same as the second device ID obtained locally;

in response to the first device ID being same as the second device ID, determining that the mobile terminal is authorized by the display device;

determining whether the camera in the display device is being occupied by an application installed in the display device;

in response to determining that the camera is being occupied, determining which application is currently occupying the camera;

in response to the application currently occupying the camera being a first application in a first video call currently performing in the display device, causing the server to send a room address for the first video call to the mobile terminal, to allow the mobile terminal to directly join the first call according to the room address;

in response to the application currently occupying the camera being a second application which does not involve in a video call, causing the server to return to the mobile terminal a message for indicating that the camera of the display device is being occupied; and in response to determining that the camera is not being occupied, automatically establishing a call process between the display device and the mobile terminal by receiving a session identification information configured for a session between the display device and the mobile terminal from the server, and controlling the display to present the first window for presenting video data from the counterpart and not to present the local window; and in response to the first device ID being not same as the second device ID, determining the mobile terminal is not authorized by the display device, and rejecting the video call request.

11. The method according to claim 10, further comprising:

receiving a switch operation input from a user while the display presents the first window for the counterpart and does not present the local window;

cancelling a floating window in response to the switch operation from the user, and establishing a window for a local video and a first window on a video layer, wherein the first window is set to be the first window for the counterpart.

12. The method according to claim 11, further comprising:

receiving an operation for switching to a small window input from the user while the display presents the window for the local video and the first window on the video layer; and in response to the operation for switching to the small window, cancelling the local window and the first window presented on the video layer, and establishing a second window and a third window on the floating layer, wherein the second window is configured for showing video data collected from the camera, and the third window is configured for showing video data sent from the mobile terminal.

13. The method according to claim 10, wherein the display device further comprises a microphone, and the method further comprises:

when the mobile terminal is authorized by the display device, in response to the push message, causing the microphone to collect audio data for sending to the mobile terminal.

14. The method according to claim 10, wherein the display device further comprises a loudspeaker, and the method further comprises:

when the mobile terminal is authorized by the display device, in response to the push message, causing the loudspeaker to output audio data sent from the mobile terminal.

15. The method according to claim 10, further comprising:

receiving a message for indicating successful authorization sent from the server;

wherein the message for indicating successful authorization is sent from the server in response to receiving the video call request initiated by the mobile terminal, and indicates that the server determines that the mobile terminal is authorized by the display device.

16. The method according to claim 15, further comprising:

determining that the mobile terminal is authorized by the display device according to the message for indicating successful authorization; and automatically establishing a call process to realize transmission of audio and video data between the display device and the mobile terminal.

17. The method according to claim 10, wherein automatically establishing the call process, comprises:

automatically sending a confirmation message to the server;

receiving a call room address, wherein the call room address is sent from the server in response to the confirmation message; and initiating a video call according to the call room address.

18. The method according to claim 10, wherein the push message comprises a first identifier, the video call request comprises the first identifier and a second identifier, wherein the first identifier is configured to indicate the display device as a called party in the video call, and the second identifier is configured to indicate the mobile terminal as the calling party in the video call.

* * * * *